US011017909B2

(12) United States Patent
Shaw et al.

(10) Patent No.: US 11,017,909 B2
(45) Date of Patent: May 25, 2021

(54) BOLT INSTALLATION AND TENSIONING SYSTEM

(71) Applicant: NuScale Power, LLC, Corvallis, OR (US)

(72) Inventors: Steven W. Shaw, Albany, OR (US); Derek Noel, Albany, OR (US)

(73) Assignee: NuScale Power, LLC, Corvallis, OR (US)

(*) Notice: Subject to any disclaimer, the term of this patent is extended or adjusted under 35 U.S.C. 154(b) by 605 days.

(21) Appl. No.: 15/841,056

(22) Filed: Dec. 13, 2017

(65) Prior Publication Data
US 2018/0190402 A1 Jul. 5, 2018

Related U.S. Application Data

(60) Provisional application No. 62/441,048, filed on Dec. 30, 2016.

(51) Int. Cl.
G21C 19/20 (2006.01)
B25B 29/02 (2006.01)
(Continued)

(52) U.S. Cl.
CPC .............. G21C 19/207 (2013.01); B23P 6/00 (2013.01); B23P 19/06 (2013.01); B23P 19/067 (2013.01);
(Continued)

(58) Field of Classification Search
CPC ........... B23P 6/00; B23P 19/06; B23P 19/067; B23P 19/12; B23P 19/107; G21C 19/207;
(Continued)

(56) References Cited

U.S. PATENT DOCUMENTS 4,233,727 A * 11/1980 Kautetzky ............. B23P 19/067
15/304
4,581,956 A * 4/1986 Robert .................... B25B 29/02
81/57.36
(Continued)

FOREIGN PATENT DOCUMENTS

DE 3521016 A1 1/1987
JP S5558491 A 5/1980
JP H01263593 A 10/1989

OTHER PUBLICATIONS

Machine translation of DE 3521016 A1, pp. 1-4, Jan. 15, 1987 (Year: 1987).*

(Continued)

Primary Examiner — Jermie E Cozart
(74) Attorney, Agent, or Firm — Perkins Coie LLP

(57) ABSTRACT

A bolt installation and removal (BIR) system is used for assembling and disassembling a nuclear vessel. The BIR system includes a platform with a stand for supporting the nuclear vessel. A track extends around an outside perimeter of the platform and multiple tool carts include wheels that roll on the track. Tool towers are located on the carts and include tool assemblies configured to install and remove bolts on the nuclear reactor vessel. Magazine towers also extend up from the tool carts next to the tool towers and include magazines that hold bolts for exchanging with the tool assemblies. Drive mechanisms move tool heads in the tool assemblies around a first vertical axis, vertically up and down, and laterally to more simply and reliably install and remove the bolts in a radioactive underwater environment.

21 Claims, 19 Drawing Sheets

(51) Int. Cl.
*B23P 19/06* (2006.01)
*B23P 19/10* (2006.01)
*B23P 19/12* (2006.01)
*B23P 6/00* (2006.01)
*G21C 13/06* (2006.01)

(52) U.S. Cl.
CPC ............ *B23P 19/107* (2013.01); *B23P 19/12* (2013.01); *B25B 29/02* (2013.01); *G21C 13/06* (2013.01); *G21C 19/20* (2013.01); *Y02E 30/30* (2013.01); *Y10T 29/49815* (2015.01); *Y10T 29/49819* (2015.01); *Y10T 29/49822* (2015.01); *Y10T 29/531* (2015.01); *Y10T 29/53478* (2015.01); *Y10T 29/53543* (2015.01); *Y10T 29/53548* (2015.01)

(58) Field of Classification Search
CPC ............ Y10T 29/531; Y10T 29/49815; Y10T 29/49819; Y10T 29/53478; Y10T 29/53543; Y10T 29/53548; B25B 29/02
See application file for complete search history.

(56) References Cited

U.S. PATENT DOCUMENTS

| | | | | |
|---|---|---|---|---|
| 4,715,111 A | * | 12/1987 | Kapoor | ................ G21C 3/335 29/723 |
| 4,873,760 A | | 10/1989 | Watanabe | |
| 5,703,916 A | * | 12/1997 | Wilhelm | ............... B23P 19/067 376/260 |
| 5,730,421 A | * | 3/1998 | Wilhelm | ............... B23P 19/067 254/29 A |
| 6,715,201 B2 | * | 4/2004 | Sato | ...................... G21C 19/02 29/712 |
| 9,457,439 B2 | * | 10/2016 | Imi | ...................... G21C 13/073 |
| 2008/0317192 A1 | * | 12/2008 | Rowell | ............... G21C 19/207 376/249 |
| 2013/0199341 A1 | * | 8/2013 | Imi | ...................... B23P 19/067 81/57 |

OTHER PUBLICATIONS

International Preliminary Report on Patentability for International Application No. PCT/US2017/066200, dated Jul. 11, 2019, pp. 12.

* cited by examiner

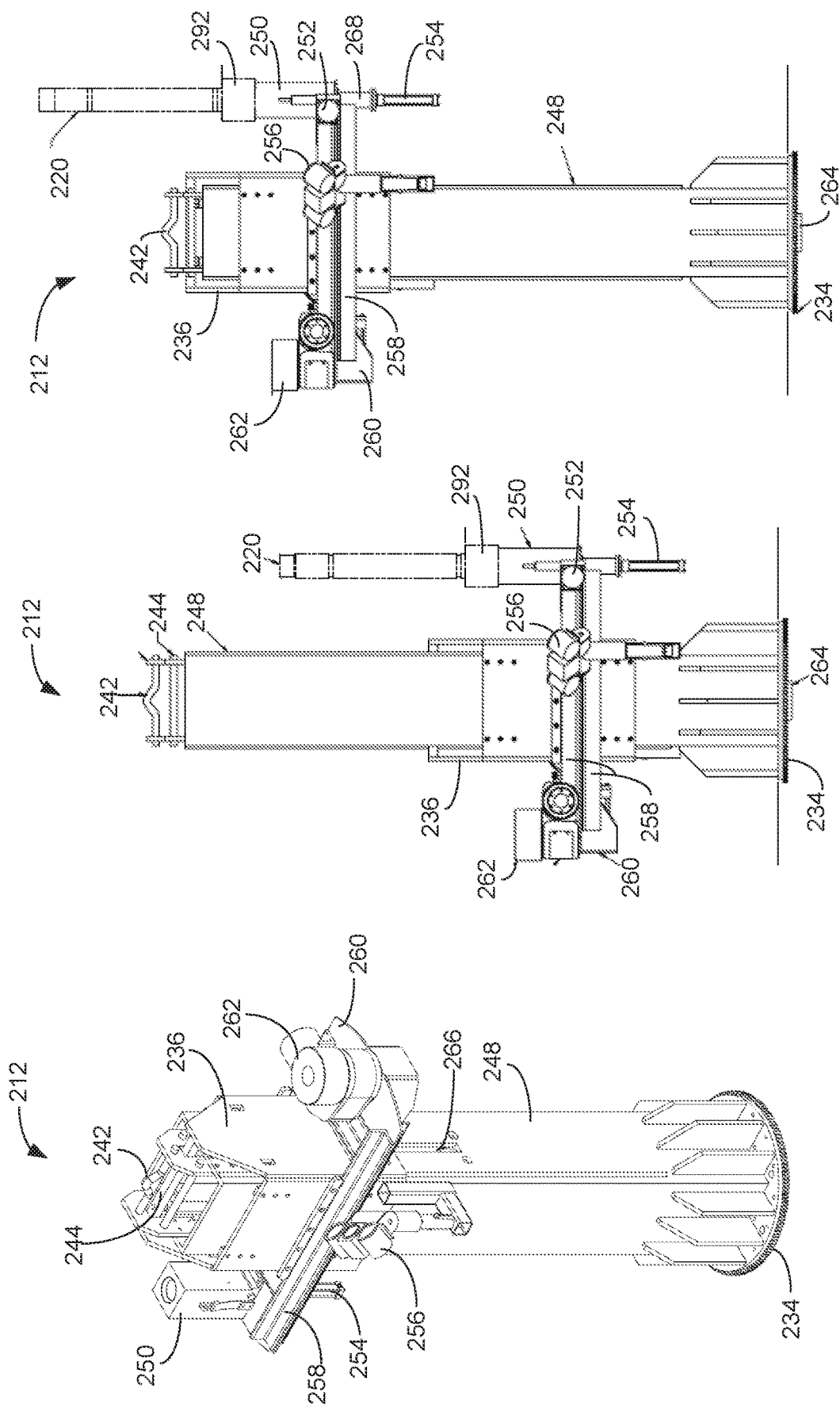

BOLT INSTALLATION AND TENSIONING SYSTEM

This application claims priority to U.S. Provisional Patent Application No. 62/441,048, filed on Dec. 30, 2016 and entitled: RXM CLOSURE BOLT INSTALLATION AND TENSIONING TOOLS (MAEB), the contents of which are herein incorporated by reference in their entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for assembling and disassembling nuclear containment and pressure vessels.

BACKGROUND

Assembly and disassembly of nuclear reactors for operation and refueling requires the installation, tensioning, de-tensioning and removal of large fasteners securing reactor vessel flanges. These operations are performed in a high radiation, remote operating work environment. The size of the fasteners and radiological work environment preclude manned installation or intervention to correct a malfunctioning machine. All stud tensioning mechanisms currently used in the nuclear, sub-sea or other industries outside manufacturing require pre-installation of the fasteners, and manual placement of the tooling used to tension the fasteners.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 5 is a perspective view of a tool tower.

FIG. 6 is a side view of the tool tower in a lowered position.

FIG. 7 is a side view of the tool tower in a raised position.

DETAILED DESCRIPTION

A remotely or autonomously operated bolt installation and removal (BIR) system installs, removes, tensions, and de-tensions closure bolts on nuclear reactor pressure vessels, nuclear containment vessels, or on any other type of vessel. The BIR system may include an array of tool carts that surround the nuclear vessel and travel and rotate to various positions to load, install, tension, de-tension, remove and store closure bolts.

The BIR system includes a platform with a stand for supporting the nuclear vessel. Tracks extend around an outside perimeter of the platform and the tool carts roll on the tracks around the nuclear vessel. The carts carry a tool tower with a rotating tool assembly and a magazine tower with a rotating magazine.

The magazine includes slots that retain and rotate the bolts into an exchange position with the tool tower. The tool assembly rotates into an intersecting position with the magazine assembly to transfer the bolts. The rotation path of the tool assembly also intersects bolt locations on the nuclear vessel. This allows the tool assembly in a single rotating path to both exchange bolts with the magazine and install or remove the bolts onto the nuclear vessel.

The unique multi-rotating axis control scheme in the BIR system simplifies hydraulic and electrical controls needed for disassembly and reassembly of nuclear vessels. The multi-tool cart system also provides an inherent redundancy since each tool cart may move to any reactor vessel location and may exchange bolts with adjacent tool carts on either side. Each tool cart operates as a separately controllable modular unit and therefore can be easily removed from the tracks for servicing.

Figure 1:
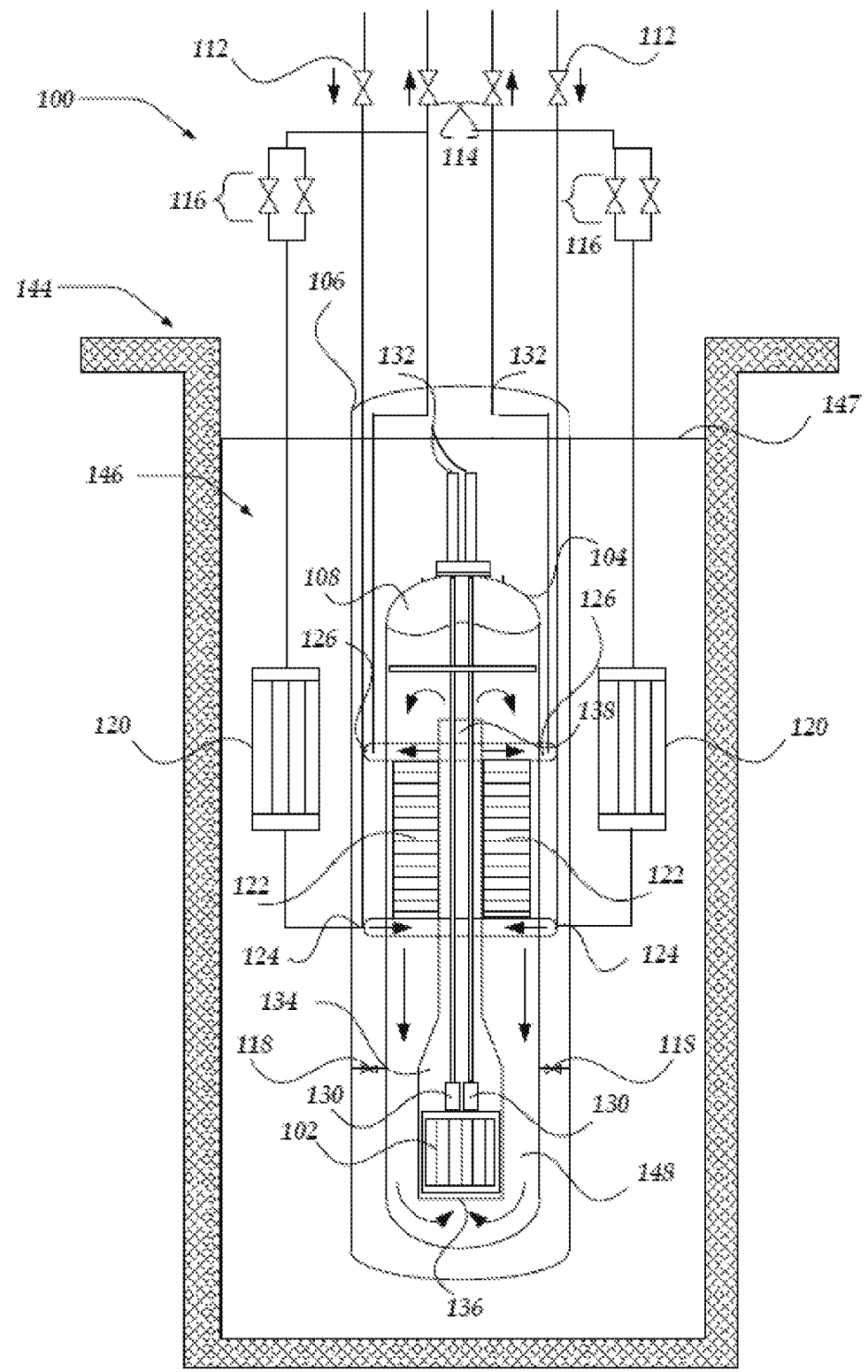
FIG. 1 shows a schematic diagram of an example power module.

FIG. 1 is a schematic diagram of an example power module assembly 100. Power module assembly 100 may comprise an integral reactor pressure vessel (RPV) 104 and a containment vessel 106. In some examples, RPV 104 may be approximately 17.7 m (58 ft) tall and 3.0 m (10 ft) in diameter. The RPV 104 may contain a reactor core 102 having a number of fuel assemblies and control rods 130. In some examples, reactor core 102 may comprise approximately thirty-seven fuel assemblies and sixteen control rod clusters. Above reactor core 102 is a central hot riser tube 138, a pair of helical coil steam generators or heat exchangers 120 that at least partially surround the riser tube 138, and an internal pressurizer 108.

FIG. 1 also illustrates an example flow path for primary coolant 148. Primary coolant 148 may circulate upward through the reactor core 102, and the heated primary coolant 148 may be transported upward through the riser tube 130. The flow path of the primary coolant 148 may then be turned downward at a pressurizer plate that separates the main body of reactor vessel 104 from pressurizer 108. The primary coolant 148 may flow over the shell side of the heat exchangers 120, where it is cooled by conduction of heat to the secondary coolant contained within the heat exchangers 120. The primary coolant 148 may continue to flow downward until its direction is reversed at the lower head of the RPV 104 where the primary coolant 148 may be turned upward back into reactor core 102. The circulation of primary coolant 148 may be maintained entirely by natural buoyancy forces of the lower density (heated) coolant exiting the reactor core 102, and the higher density (cooled) coolant exiting the annulus of the heat exchangers 120.

On the secondary coolant side, feedwater may be pumped into the steam generator tubes where it boils to generate superheated steam. The steam may be circulated to a dedicated turbine-generator system. Low pressure steam exiting the turbine may be condensed and recirculated to the feedwater system. The entire nuclear steam supply system may be enclosed in a steel vessel, such as containment vessel 106, which in some examples may be approximately twenty three meters tall and approximately five meters in diameter.

In some examples, power module assembly 100 may include a modular nuclear reactor assembly including one or more fission reactors. Power module assembly 100 may be housed in a power module bay 144. The power module bay 144 may include a cooling pool 146 of water or some other material that includes thermal properties enabling the cooling of power module assembly 100. At least a portion of power module assembly 100 may be submerged in the cooling pool 146. Accordingly, at least a portion of the power module assembly 100 may be located below the top of a water line 147 of the cooling pool 146.

Additionally, power module assembly 100 may comprise a power module core 102. Power module core 102 may comprise any device, assembly, apparatus, or configuration that is employed to controllably generate heat. Thus, power module assembly 100 may comprise a heat generating assembly. In some examples, power module core 102 may comprise a nuclear reactor core, such as but not limited to a fission reactor core. Power module core 102 may be immersed in power module coolant 148. In at least one example, power module coolant 148 includes water or any other material that enables the flow of heat (generated by the power module core 102) away from the reactor core 102.

In some examples, power module assembly 100 may comprise a core shroud 134 that at least partially constrains, channels, or otherwise guides a flow of power module coolant 148. Power module core 102 may be at least partially surrounded by the core shroud 134. Power module core 102, core shroud 134, and power module coolant 148 are housed within a pressure vessel 104.

In various examples, power module core 102 may be configured to generate heat that is transferred to power module coolant 148. As shown by the flow arrows, heating power module coolant 148 in the pressure vessel 104 may generate a generally vertical circular convection current of the power module coolant 148. Core shroud 148 may be configured to at least partially constrain, channel, or otherwise guide the generally vertical circular convection current of the power module coolant 148. A pressurizer 108 may be configured to regulate the internal pressure within pressure vessel 104 that is due to at least the heating and/or the convection current of the power module coolant 148.

Power module core 102 may be configured to heat the lower portion of the power module coolant 148 that is in the lower plenum 136 of the core shroud 134. The heated power module coolant 148 flows upward and out of the shroud riser 138. As the power module coolant 148 flows upward, the heated power module coolant 148 provides heat to a plurality of steam generators 122. Due to at least this heat exchange, as the heated power module coolant 148 flows out of the shroud riser 138, the power module coolant 148 is cooled.

As shown by the flow arrows in FIG. 1, once outside of the shroud riser 138, the power module coolant 148 flows generally downward between the core shroud 134 and the pressure vessel 104. The convection current pulls the cooled power module coolant 148 near the lower plenum 136 back into the core shroud 134. Power module core 102 may be configured to reheat the power module coolant 148 such that the convection current continues to circulate and cool the reactor core 102.

Pressure vessel 104 may be housed within a containment vessel 106. Containment vessel 106 may prohibit the release of material out of the pressure vessel 104, including any material included in the reactor core 102, as well as the power module coolant 148. In some examples, power module assembly 100 may comprise a plurality of power module recirculation valves 118 to vent pressure within and/or dissipate excess heat away from the pressure vessel 104.

Feedwater may flow in a circuit that includes the steam generators 122 and electrical generators. Within the steam generators 122, the feedwater may be heated to generate stream. The generated steam flows out of the steam headers 126 and carries the transferred heat away from power module assembly 100. A plurality of steam isolation valves 114 may be configured to regulate the flow of the steam away from the power module assembly 100. The steam may be routed via a steam bus, such as but not limited to steam bus 160 of FIG. 2, to electrical generators, such as but not limited to turbine generator 176 of FIG. 2, to generate electrical power or some other form of usable power.

After the energy within the steam generates the electrical power, the return of the cooled feedwater to the power module assembly 100 may be regulated via a plurality of feedwater isolation valves 112. The cooled feedwater may be returned to the steam generators 122 via the feedwater headers 124, to complete the circuit.

In at least some examples, even after a shutdown of the power module assembly 100, the power module core 102 may be configured to continue generating heat. For instance, in examples where the reactor core 102 includes a nuclear reactor core, the nuclear reactor core may continue to generate heat during a decay period associated with the spent fuel within the nuclear reactor core. The heat that is generated after a shutdown of the power module assembly 100 may be decay heat. Accordingly, to ensure that the reactor core 102 and other components of the power module assembly 100 do not overheat, at least due to decay heat, the power generated by the reactor core 102 may be dissipated.

To dissipate decay heat in some examples, the power module assembly 100 includes a decay heat removal system (DHRS). The DHRS may include a plurality of DHRS heat exchangers 120 submerged in the cooling pool 146 of the power module bay 144, as well as a plurality of a plurality of DHRS valves 116 to divert the flow of the feedwater/steam away from the steam bus.

During a shutdown of the power module assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of DHRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the reactor core 102 may be regulated by the positioning of one or more control rods 130. The positioning of the one or more control rods 130 may be driven by control rod drives 132.

Bolt Installation and Removal (BIR) System

Figure 2:
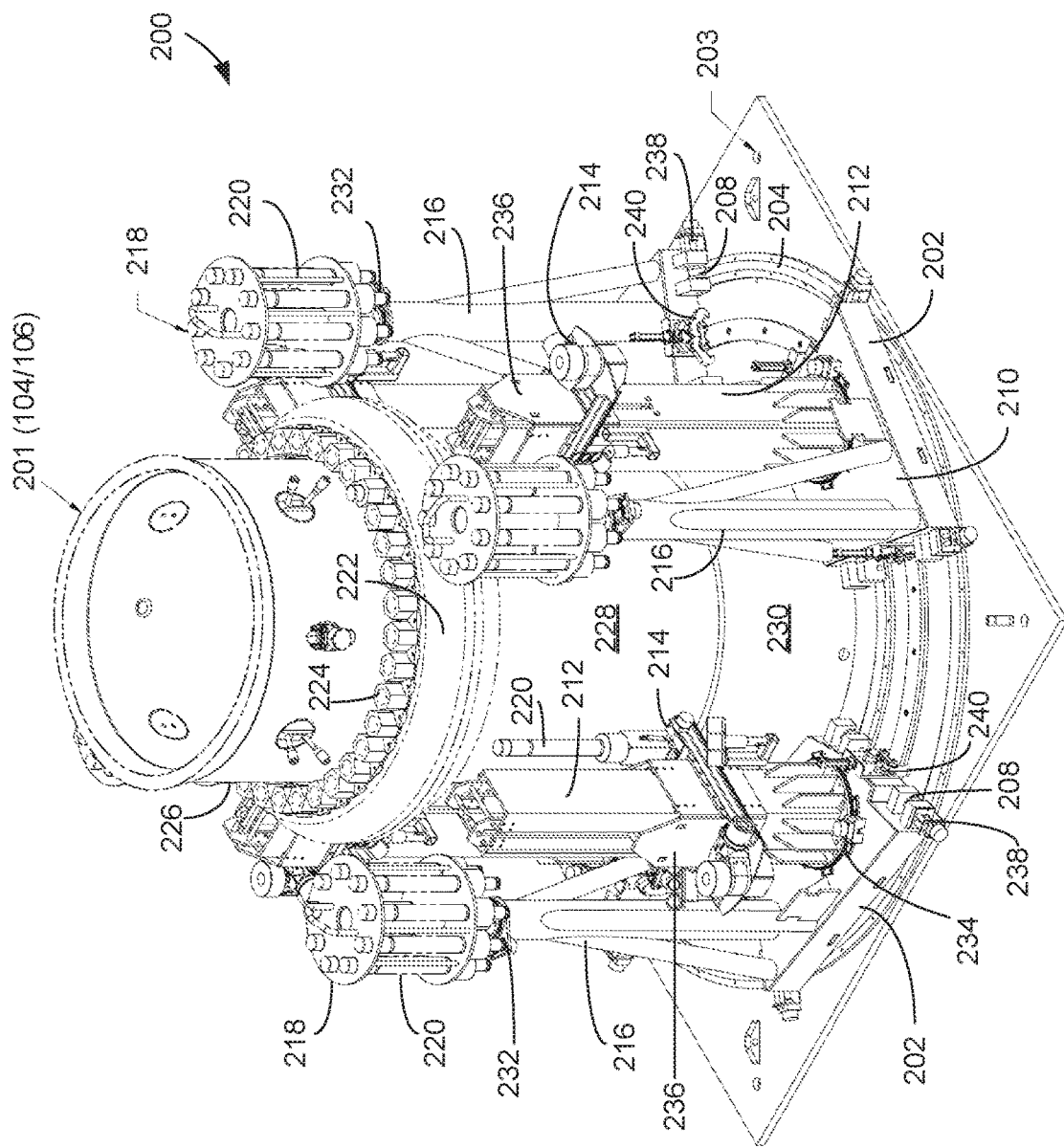
FIG. 2 is a perspective view of a bolt installation and removal (BIR) system.
Figure 3:
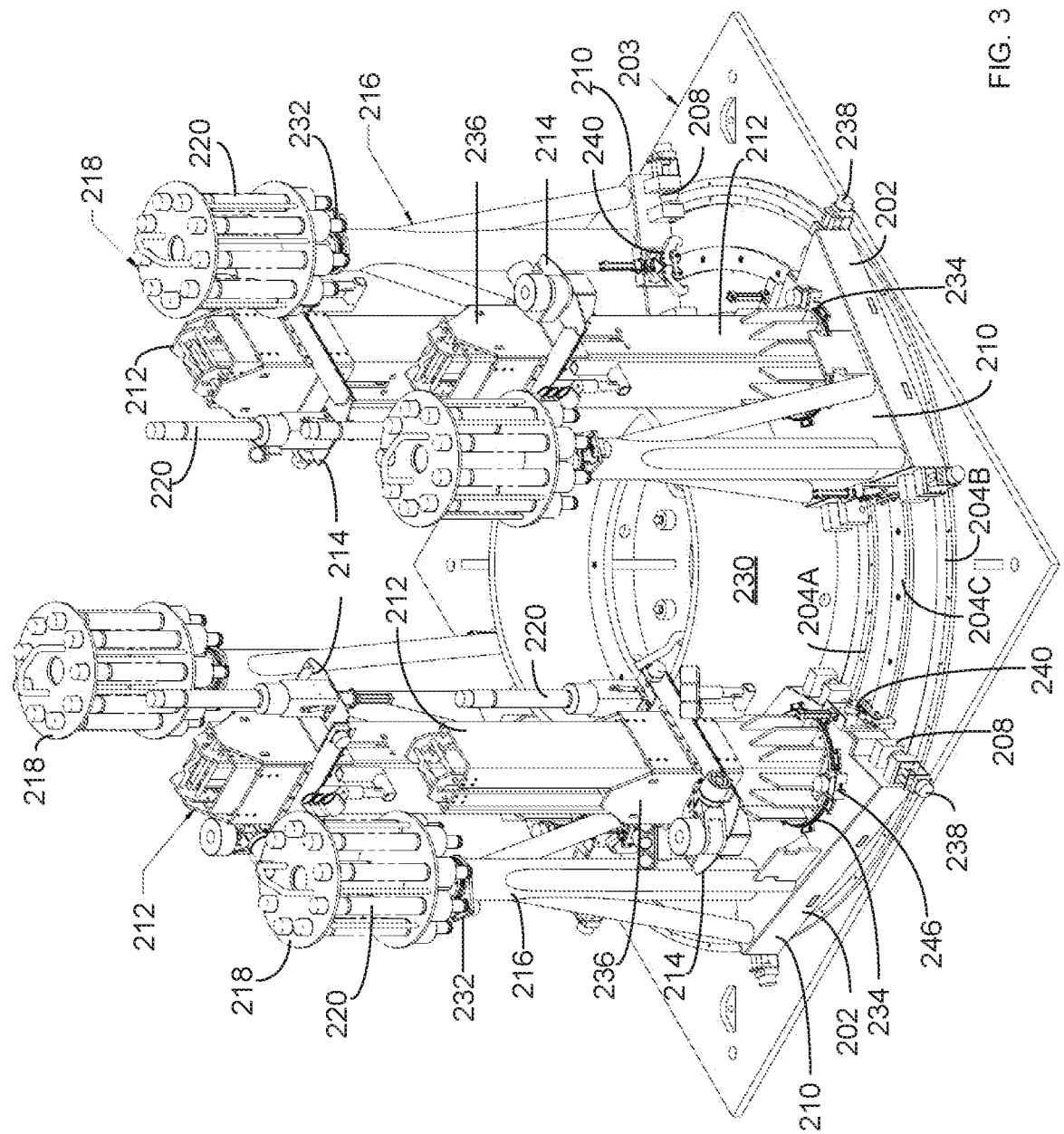
FIG. 3 is another perspective view of the BIR system without a nuclear containment vessel.

FIG. 2 is a perspective view of a bolt installation and removal (BIR) system 200 used for assembling and disassembling reactor pressure vessel (RPV) 104 or containment vessel (CNV) 106 described above in FIG. 1. FIG. 3 is another perspective view of BIR system 200 without RPV 104 or CNV 106. Referring to FIGS. 2 and 3, periodically reactor core 102 in FIG. 1 needs servicing and/or refueling. During servicing a crane may move CNV 106 and contained RPV 104 from power module bay 144 into a first BIR system 200. First BIR system 200 may be located in a service bay and submerged in a cooling pool of water.

First BIR system 200 may via remote control and/or autonomously remove bolts 220 from a flange 222 on containment vessel 106. In one example, bolts 220 may weigh around 500 pounds and may be about six feet long. Of course BIR system 200 may operate with any other bolt size.

The crane may remove an upper head 226 of containment vessel 106 from a lower section 228. The crane then may lift RPV 104 out of containment vessel 106 and move RPV 104 to a second BIR system 200 also submerged in a cooling pool of water. The second BIR system 200 removes bolts from the upper head section of RPV 104 in substantially the same manner first BIR system 200 removes bolts 220 from CNV 106. A crane removes the upper head section of RPV 104 for servicing and refueling reactor core 102 in FIG. 1.

A reverse process is used for reinstalling serviced power module assembly 100 back into power module bay 144 in FIG. 1. For example, the crane may replace the upper head of RPV 104 onto the lower section. The second BIR system 200 reinstalls inspected bolts into flanges securing the upper head section to the lower section. The crane carries RPV 104 to the first BIR system 200 that holds CNV 106. The crane lowers RPV 104 into lower section 228 of CNV 106. The first BIR system 200 then reinstalls bolts 220 into flange 222 securing the upper head section 226 to lower section 228. The crane carries reassembled and reserviced power module assembly 100 that include both RPV 104 and CNV 106 to power module bay 144 in FIG. 1.

First and second BIR systems 200 operate substantially the same. However, the second BIR system 200 may be sized to operate on the smaller dimensions of RPV 104. The explanation below applies equally to both the first BIR system 200 that removes and installs bolts on CNV 106 and the second BIR system 200 that removes and installs bolts on RPV 104. RPV 104, CNV 106 or any other device that may be assembled or disassembled by BIR system 200 is referred to generally below as a nuclear vessel 201.

BIR system 200 includes a platform 203 and a track 204 that extends in a circle around a circular support 230. Circular support 230 is sized to receive and support either CNV 106 or RPV 104 in an upright position. Multiple tool carts 202 include wheels 208 that roll on tracks 204 to different locations around nuclear vessel 201 to remove or install bolts 220.

Each tool cart 202 may include a tool tower 212 that extends up from a cart platform 210 and supports a tool assembly 214. Each tool cart 202 also may include a magazine tower 216 that supports a magazine 218. Tool carts 202 move tool assemblies 214 and magazines 218 around nuclear vessel 201 to remove bolts 220 from flange 222. Tool assemblies 214 place the removed bolts 220 in magazines 218. The crane then removes upper head section 226 from lower section 228. After servicing, upper head section 226 is re-installed on vessel 201. Tool carts 202 then move tool assemblies 214 and associated magazines 218 around vessel 201 reinstalling inspected bolts 220 back into flange 222. Tool assemblies 214 take the inspected bolts 200 from adjacent magazine assemblies 218 and insert and tighten the bolts 220 into flange 222.

Each tool tower 212 is rotatably connected to an associate cart platform 210 by a motorized gear assembly 234. Gear assembly 234 rotates tool tower 212 and attached tool assembly in a 360 degree circle about a center vertical axis. Each magazine 218 is rotatably connected to the associated magazine tower 216 by a motorized gear assembly 232. Gear assembly 232 rotates magazine 218 in a 360 degree circle about a vertical axis. Tool towers 212 also may include carriages 236 that move tool assemblies 214 vertically up and down along tool towers 212.

Carriage 236 can be lowered underneath flange 222. Gear assembly 234 then rotates tool tower 212 positioning tool assembly 214 underneath a bolt 220 installed in flange 222. Carriage 236 is raised so tool assembly 214 engages with a bottom end of the bolt 220 extending down from the bottom of flange 222. A tool head in tool assembly 214 unscrews bolt 220 from a top nut 224 that remains attached to the top side of flange 222. Carriage 236 is then lowered removing bolt 220 from flange 222. Nuts 224 may be attached to flange 222 with some play to realign with a slightly misaligned bolt 220.

Gear assembly 234 rotates tool tower 212 locating removed bolt 220 underneath magazine 218. Carriage 236 is raised inserting bolt 220 into a slot in magazine 218. The tool head in tool assembly 214 screws bolt 220 into magazine assembly 218. Carriage 236 may lower tool assembly 214 leaving bolt 220 in magazine 218. Gear assembly 234 may rotate tool tower 212 moving tool assembly 214 back underneath the bolt hole of the previously removed bolt 220. Gear assembly 232 also may rotate magazine 218 so a next unused slot is in position to receive another bolt 220 from tool assembly 214.

Motors 238 on tool carts 202 may rotate wheels 208 moving the tool head in tool assembly 214 underneath a next adjacent bolt in flange 222. Tool assembly 214 and magazine assembly 218 then repeat the same process removing the next bolt 220 from flange 222 and placing the removed bolt 220 into the next open slot in magazine 218.

The process is reversed for re-installing inspected bolts from magazine 218 back into flange 222. For example, after servicing reactor core 102 in FIG. 1, upper head section 226 of nuclear vessel 210 is located back on top of lower section 228. Gear assembly 234 rotates tool assembly 214 underneath magazine 218. Carriage 236 raises the tool head in tool assembly 214 up into the bottom end of one of bolts 220 in magazine 218. The tool head unscrews bolt 220 from magazine 218 and carriage 236 lowers tool assembly 214 removing the unscrewed bolt 220 from magazine 218. Gear assembly 232 may rotate a next bolt 220 in magazine 218 into the exchange position with tool assembly 214.

Gear assembly 234 rotates the tool head in tool assembly 214 underneath the bolt hole in flange 222. Carriage 236 is raised inserting bolt 220 up into the flange bolt hole. The tool head in tool assembly 214 screws bolt 220 into top nut 224. Carriage 236 lowers tool assembly 214 and gear assembly 234 rotates tool tower 212 locating the tool head of tool assembly 214 underneath a next bolt 220 in magazine 218. Motors 238 then move tool cart 202 to a next adjacent bolt hole in flange 222.

Multiple tool carts 202 are placed on tracks 204 and operate in unison to reduce the time required to remove and install bolts 220 from and on flange 222. For example, FIGS. 2 and 3 show four tool carts 202 aligned at different 90 degree positions around nuclear vessel 210. However, fewer or more tool carts 202 may operate together on tracks 204. A control system may control multiple tool carts 202 to operate in unison. For example, each tool cart 202 may move to a next bolt location on flange 222 when an adjacent tool cart 202 completes a similar bolt installation or removal operation.

Each tool cart 202 also may operate independently. This increases the redundancy of BIR system 200. For example, an assembly on one of tool carts 202 may fail. The non-operating tool cart 202 can either be removed from tracks 204 or may continue to roll along rail 204 during the bolt removal or installation. Other operating tool carts 202 can perform the bolt installation or removals for the non-operating tool cart.

Hold down clamps 240 are attached to front and back ends of each tool cart 202. A middle track 204C extends between an inside trace 204A and an outside track 204B. Hold down clamps attach onto middle track 204C during a seismic event to prevent tool cart 202 from tipping over.

Figure 4:
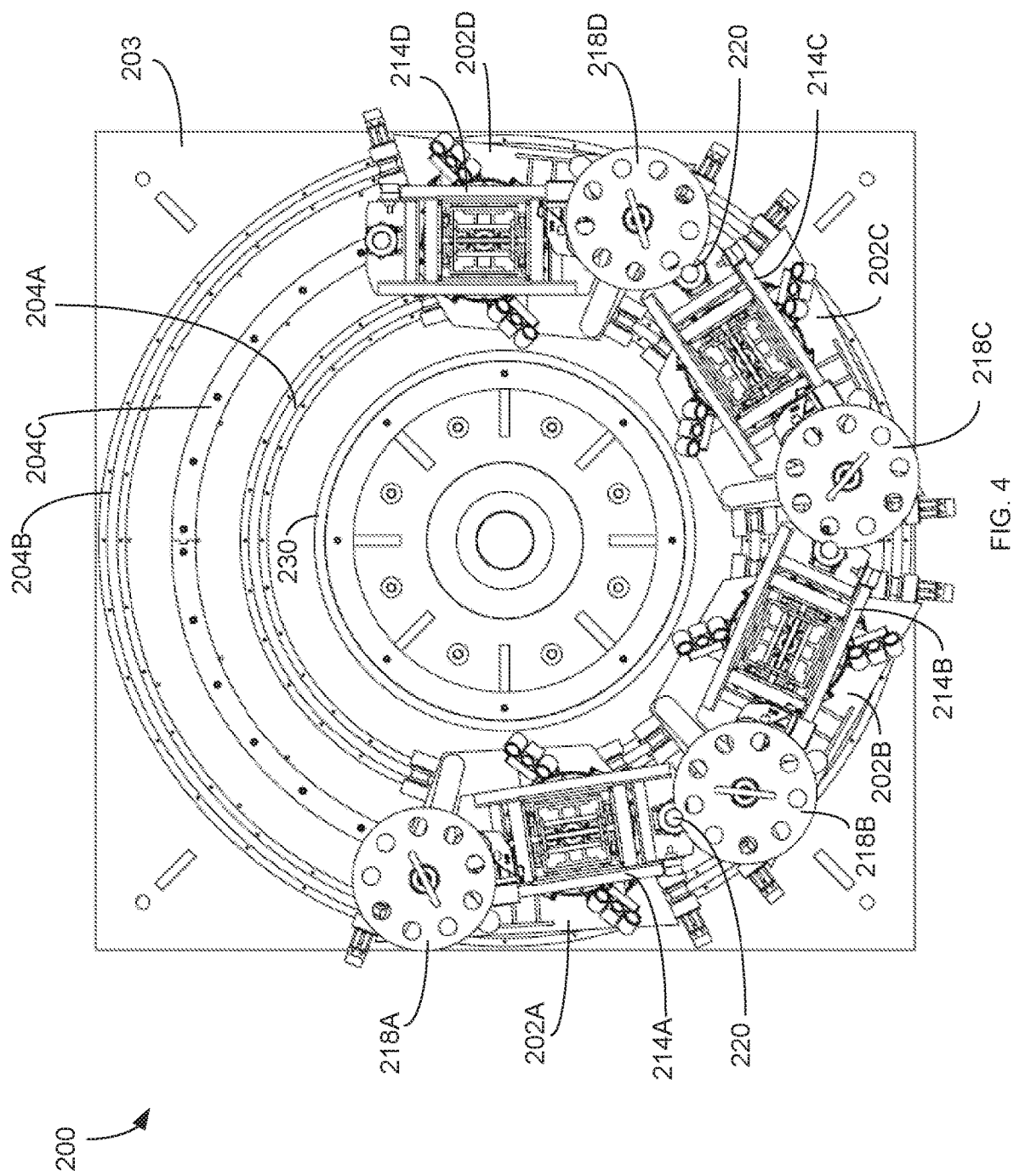
FIG. 4 is a top view of the BIR system with multiple tool carts located on one side of a track.

FIG. 4 shows a top view of BIR system 200 with multiple tool carts 202 bunched together on one side of platform 203. Tool carts 202 may be located next to each other as shown in FIG. 3 to provide more space for loading nuclear vessel 201 into support 230. Tools carts 202 can also be located next to each other so a tool assembly 214 can remove or place bolts 220 into a magazine 218 on an adjacent tool cart 202. For example, tool cart 202B may be located adjacent to tool cart 202A. Tool assembly 214A may load or remove bolts 220 from magazine 218B on tool cart 202B. Similarly, tool assembly 214C on tool cart 202C may load or remove bolts 220 from magazine 218D on tool cart 202D. This further increase redundancy by allowing tool carts 202 to load and remove bolts from other tool carts 202.

Figure 8:
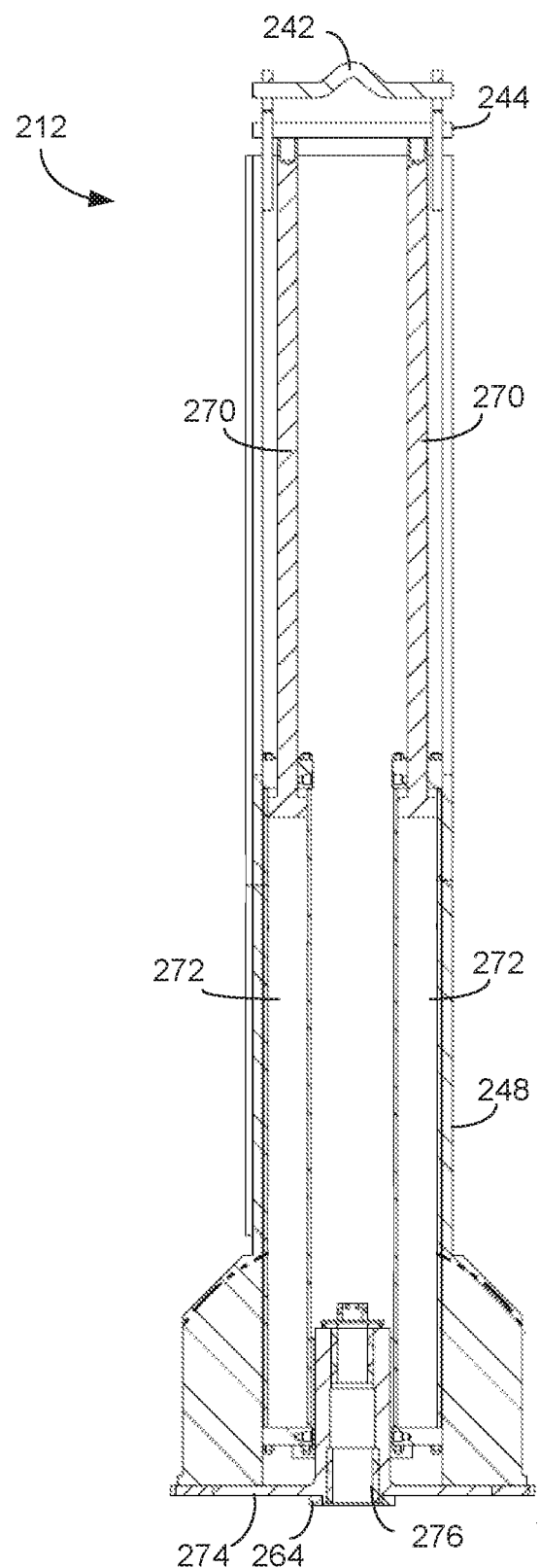
FIG. 8 is a side sectional view of the tool tower.

FIG. 5 is perspective view of tool tower 212, FIG. 6 is a side view of tool tower 212 in a lowered position, FIG. 7 is a side view of tool tower 212 in a raised position, and FIG. 8 is a side sectional view of tool tower 212. Referring to FIGS. 5-8, tool tower 212 includes a base 248 that is connected at a bottom end to gear assembly 234. FIG. 8 shows a hub 274, washer 264, and bushing 276 that attach to a bottom end of base 248 and receive a shaft that extends up from platform 210 of tool cart 202 (see FIG. 19). Gear assembly 234 attaches underneath hub 274 and rotates tool tower 212 above a vertical axis.

Carriage 236 is connected at a top end to a brace rod 244. As also shown in FIG. 8, brace rod 244 is connected to two pistons 270 that are controlled by two associated cylinders 272. Extending and retracting pistons 270 move brace rod 244 and attached carriage 236 vertically up and down along the outside of base 248. Two slots 266 extend along opposite sides of base 248 and allow carriage 236 to move between the raised position shown in FIGS. 5, 7, and 8 to the lowered position shown in FIG. 6.

A rail 258 is rigidly attached around carriage 236 and supports a horizontally movable slide plate 260. Slide plate 260 extends out from opposite sides of carriage 236 and on one end supports an install head 250 and on an opposite end supports a tensioning head 262. A motor 252 moves slide plate 260 over the top of rail 258 into different horizontal lateral positions.

For example, a gear attached to motor 252 may engage with teeth formed in rail 258 that cause slide plate 260 to extend or retract out from the sides of carriage 236. In another example, a hydraulic piston connected between rail 258 and slide plate 260 may push and pull slide plate 260 into different horizontally extended positions. Examples of slide plate 260 moving into different horizontally extended positions is shown in more detail below.

Install head 250 is configured to attach and detach bolts 220 to and from magazine 218 and flange 222 of nuclear vessel 210 (FIGS. 2 and 3). A drive holder 268 attaches a drive bit cylinder 254 to install head 250. As described in more detail below, install head 250 clamps onto bolts 220 during transfer operations between magazine 218 and flange 222.

Tensioning head 262 is configured to tighten closure nuts 292 and bolts 220 previously installed on flange 222 by install head 250, or loosen up closure nuts 292 and bolts 220 for subsequent removal by install head 250. Tensioning heads 262 are known to those skilled in the art and are therefore not described in further detail. Install head 250 is described in more detail below.

Cameras and lights 256 are attached to base 248 and on other locations of the tool cart. The cart operations described above and below may be performed autonomously using computer vision via cameras 256, or may be performed remotely via an operator. The hydraulic and electrical control systems that operate cameras 256 and the other mechanical devices on the tool cart may be located remotely from BIR system 200.

Gear assembly 234 is rotated to move install head 250 or tensioning head 262 into aligned positions underneath a bolt location in magazine 218 or in flange 222. Slide plate 260 is moved laterally to further align install head 250 or tensioning head 262 with the bolt or bolt hole location. For example, due to tolerances, rotating tool assembly 214 underneath flange 222 may not precisely align install head 250 or tensioning head 262 with an installed bolt 220. Slide plate 260 is moved slightly forward or backwards to account for the manufacturing tolerance.

When aligned, pistons 270 move carriage 236, attached install head 250 and attached tensioning head 262 into different vertical positions underneath magazine 218 and flange 222. For example, carriage 236 may raise up underneath flange 222 and attach install head 250 to the bottom end of a bolt 220. After detaching bolt 220, cylinders 272 retract pistons 270 lowering carriage 236 and sliding bolt 220 down and out of flange 222. Install head 250 is then rotated via gear assembly 234 underneath an open slot in magazine 218. Cylinders 272 extend pistons 270 moving install head 250 and attached bolt 220 up into the open slot in magazine 218. After installing bolt 220 into magazine 218, cylinders 272 retract pistons 270 lowering install head 250 into a next bolt removal position.

Figures 9, 10, 11:
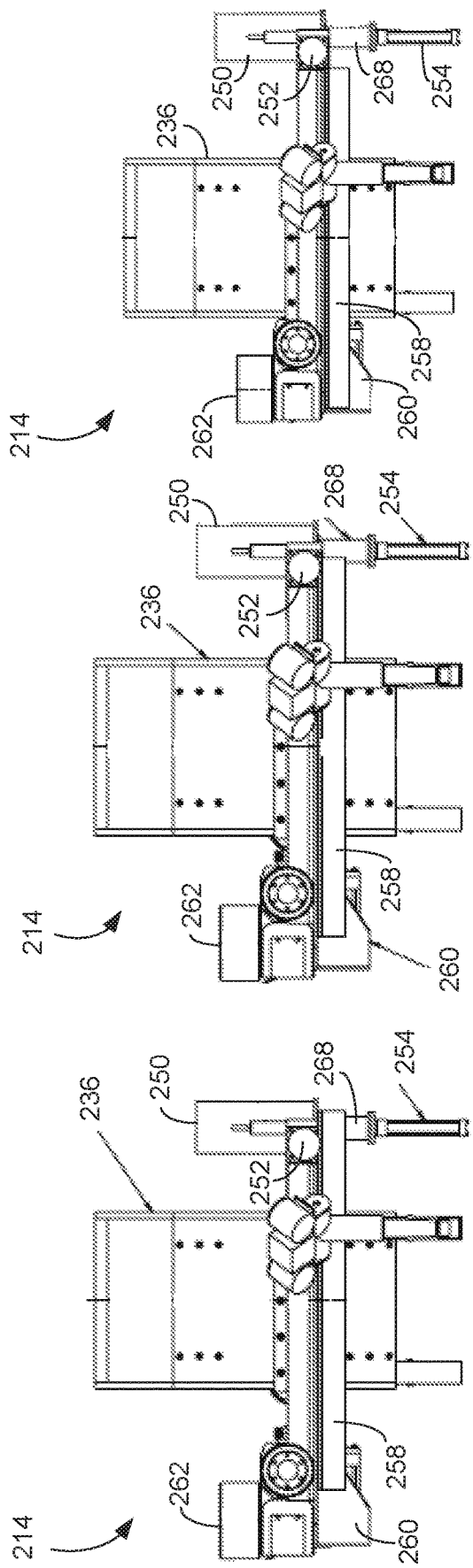
FIG. 9 is a side view of a tool assembly in a retracted position.
FIG. 10 is a side view of the tool assembly in an intermediate position.
FIG. 11 is a side view of the tool assembly in an extended position.

FIGS. 9-11 show the lateral movement of tool assembly 214 in more detail. Due to tolerances in the manufacturing of the nuclear vessel, install head 250 or tensioning head 262 may not align correctly with a bolt hole in flange 222 of nuclear vessel 210. Slide plate 260 provides another direction of movement for tool assembly 214 to adjust for bolt hole position variances. The explanation below is directed to install head 250 but is also applicable to tensioning head 262 only moving slide plate 260 in an opposite direction.

In one example, install head 250 may be too far over a bolt 220 when rotated into a bolt removal or bolt installation position underneath flange 222 of nuclear vessel 201 in FIG. 2. Motor 252 may rotate in a first direction moving slide plate 260 to the left over rail 258 as shown in FIG. 9. Motor 252 moves slide plate 260 to the left until install head 250 is aligned underneath the bolt hole location.

FIG. 10 shows an intermediate lateral position of slide plate 260. This intermediate position may correspond to a normal operating position where the bolt hole is in a substantially zero tolerance location.

FIG. 11 shows tool slide plate 260 moved in an opposite direction. For example, install head 250 may be rotated into a bolt removal or bolt installation position underneath flange 222 of nuclear vessel 201 in FIG. 2. Due to the tolerances in the manufacturing of nuclear vessel 210, install head 250 may not reach the bolt 220 located on nuclear vessel 210. Motor 252 may rotate in a second direction sliding slide plate 260 to the right over rail 258 as shown in FIG. 11 aligning install head 250 underneath the bolt hole location.

As explained above, tool tower 212 only uses three active control elements to install or detach bolts 220. Hydraulic motor 234 rotates tool tower 212, hydraulic cylinders 272 raise and lower carriage 236, and hydraulic motor 252 moves slide plate 260 laterally back and forth. This simple control scheme increases reliability and reduces cost.

Figure 12:
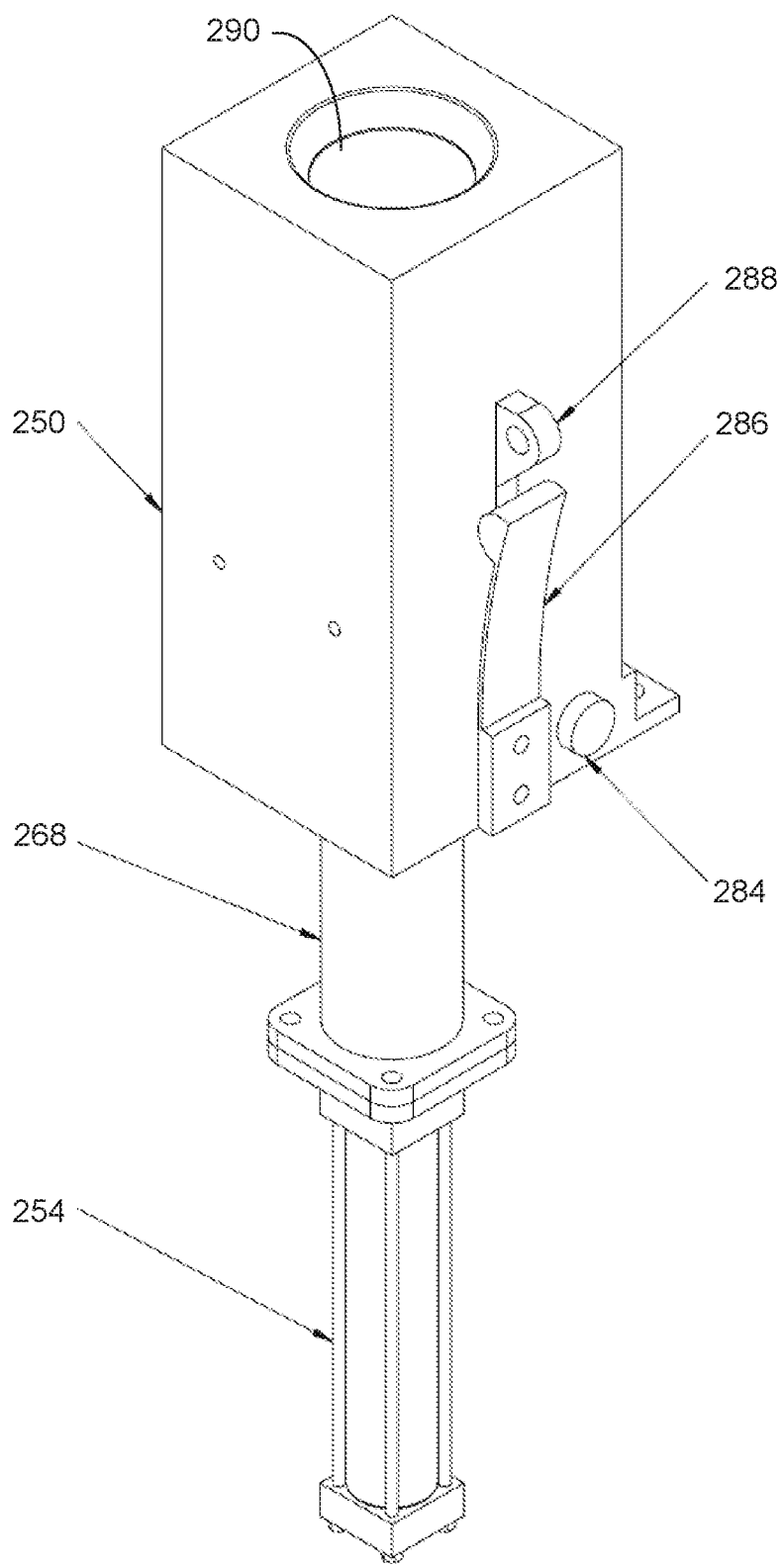
FIG. 12 is a perspective view of an install head.
Figure 13:
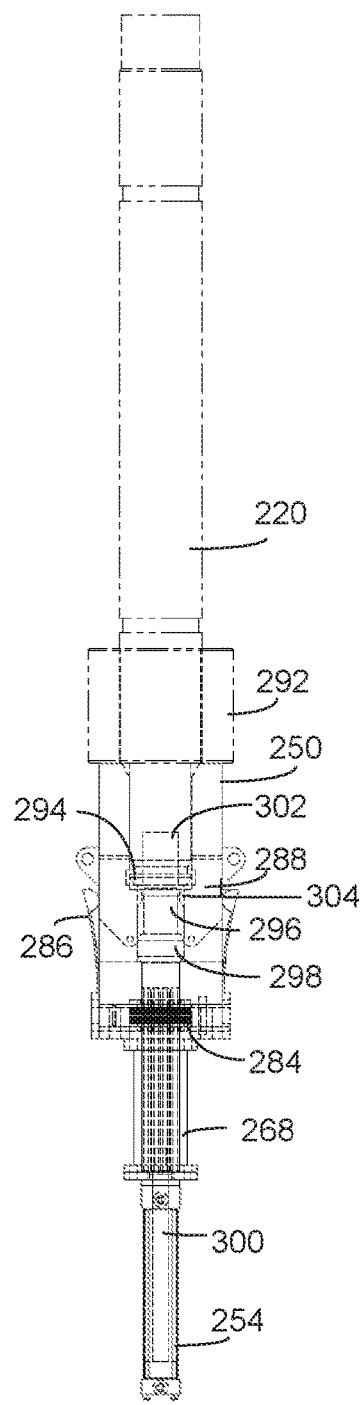
FIG. 13 is a side phantom view of the install head in a retracted position.
Figure 14:
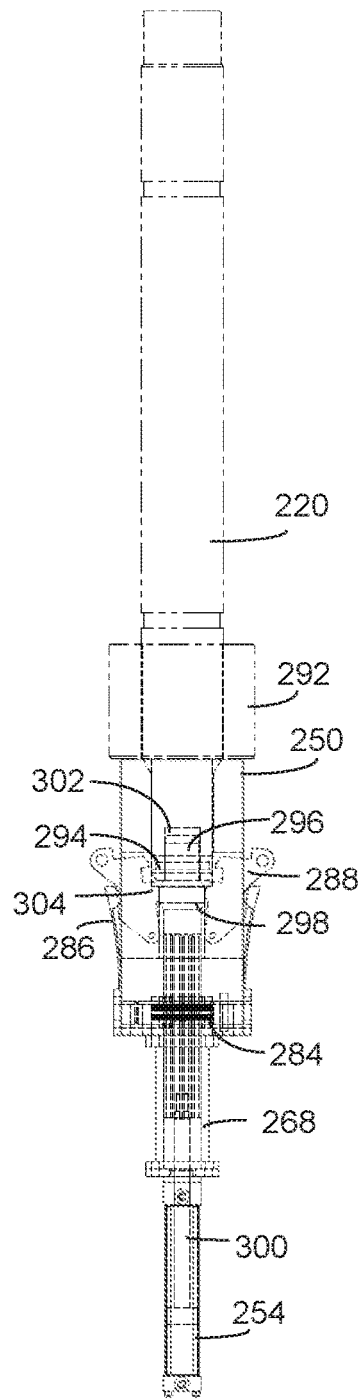
FIG. 14 is a side phantom view of the install head in an intermediate position.
Figure 15:
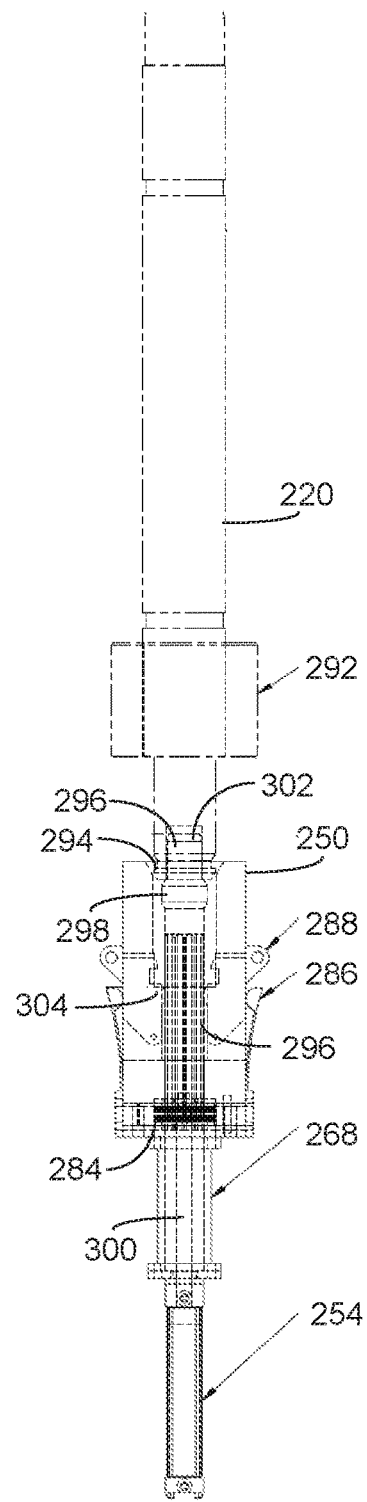
FIG. 15 is a side phantom view of the install head in an extended position.

FIG. 12 is a perspective view of install head 250. FIGS. 13-15 are phantom side views where the phantom lines show internal components of install head 250. A closure nut 292 is previously screwed onto the bottom end of bolt 220. FIG. 12 shows an opening 290 in install head 250 that receives the bottom end of bolt 220. FIG. 13 shows bolt 220 fully inserted and locked into install head 250, FIG. 14 shows how bolt 220 is unlocked from install head 250, and FIG. 15 shows bolt 220 extended out of install head 250. Install head 250 includes to oppositely reciprocating bolt clips 288 that are compressed toward a closed position by clip springs 286.

Referring specifically, to FIG. 13, the bottom end of bolt 220 may have a mushroom shaped head 294 with oppositely inclining sides. A square or hexagon shaped bolt hole 302 extends up into the bottom end of bolt 220. Extending install head 250 upwards, causes the sides of bolt head 294 to spread open bolt clips 288. As install head 250 moves further upwards, springs 286 push bolt clips 288 back toward each other locking over the top of bolt head 294. The locked position of clips 288 over bolt head 294 prevents bolt 220 from coming out of install head 250 while being pulled out of a bolt hole in flange 222. Bolt clips 288 also more securely hold bolt 220 in install head 250 while being transported between flange 222 and magazine 218.

Referring specifically to FIG. 14, drive bit cylinder 254 is activated to release bolt 220 from clips 288. Drive bit cylinder 254 extends a piston 300 that pushes a drive rod 296 upwards into hole 302. Extending the top end of drive rod 296 further up into bolt hole 302 forces a wider shoulder 298 formed on drive rod 296 in between two oppositely facing protuberances 304 formed on the insides surfaces of bolt clips 288. Shoulder 298 pushes clips 288 further apart releasing head 294 of bolt 220.

Referring specifically to FIG. 15, cylinder 254 continues to extend piston 300 pushing bolt 220 and attached closure bolt 292 upwards into either a bolt hole in flange 222 of nuclear vessel 210 or into a slot in magazine 218. When bolt 220 is fully inserted, a worm gear 284 starts rotating drive rod 296. As mentioned above, bolt hole 302 may have a square or hexagonal shape. The top end of drive rod 296 may have a similar square or hexagonal shape that inserts into bolt hole 302. Rotating drive rod 296 with worm gear 284 screws a top end of bolt 220 into one of nuts 224 secured to the top of flange 222 in FIG. 2. If bolt 220 is being inserted into magazine 218, rotating drive rod 296 screws the top end of bolt 220 into an upper plate of magazine 218.

Figure 16:
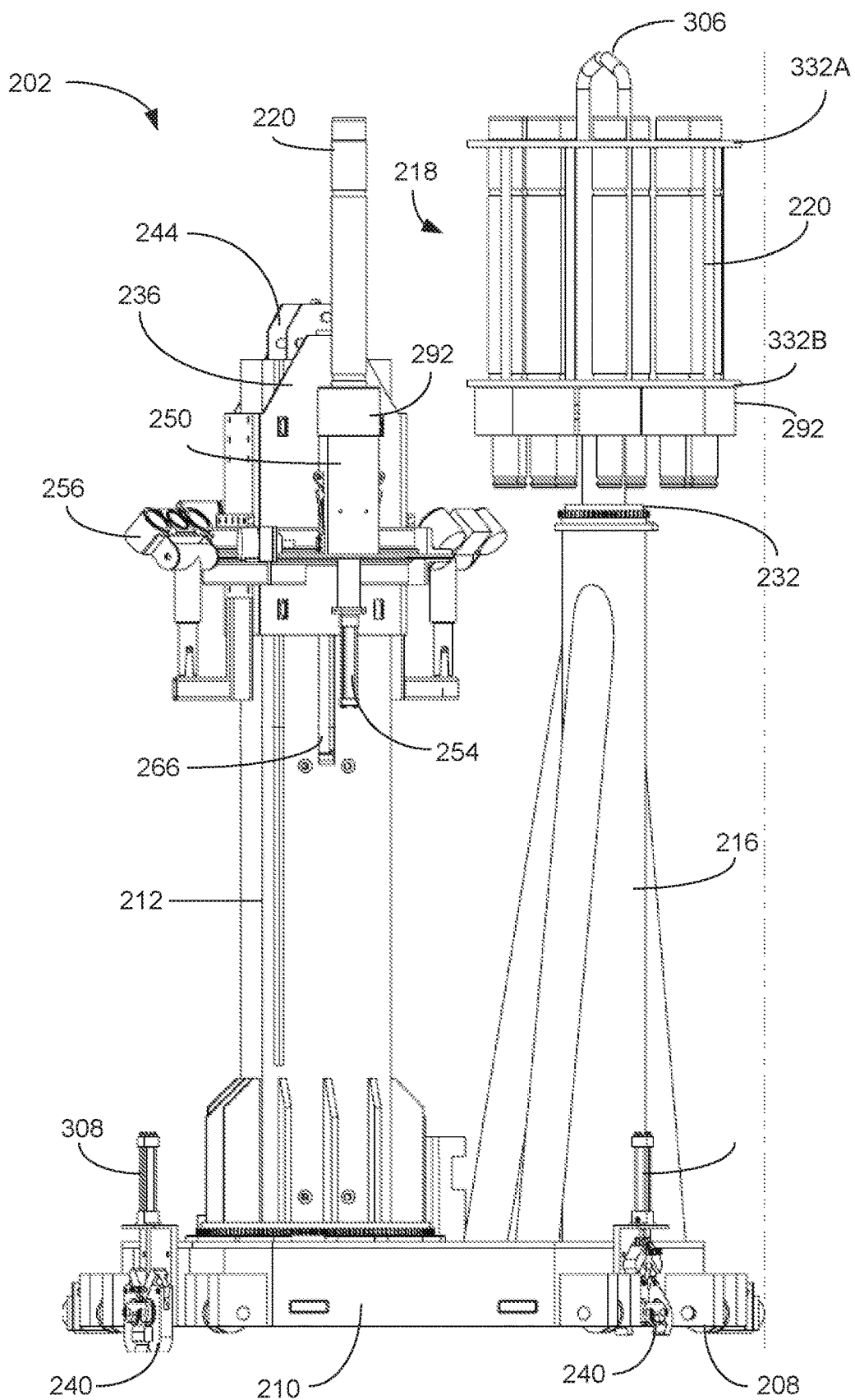
FIG. 16 is a side view of a tool cart.

FIG. 16 is a side view of tool cart 202. Hold down clamps 240 are located on opposite ends of tool cart 202. Hold down cylinders 308 extend up from hold down clamps 240. Install head 250 is shown carrying a bolt 220 and an attached closure nut 292. Magazine 218 is shown carrying multiple bolts 220.

Carriage 236 on tool tower 212 may lower install head 250 and attached bolt 220 below lower plate 332B. Carriage 236 is raised inserting bolt 220 up into an empty slot in magazine 218. Install head 250 then screws the top end of bolt 220 into a top plate 332A of magazine 218 until closure nuts 292 seat against a lower plate 332B.

For removal, empty install head 250 is moved underneath magazine 218 and raised up inserting over the bottom end of one of bolts 220 and against closure nut 292. Install head 250 unscrews the top end of the bolt from upper plate 332A and carriage 236 is lowered removing bolt 220 and nut 292 from magazine 218.

Figure 17:
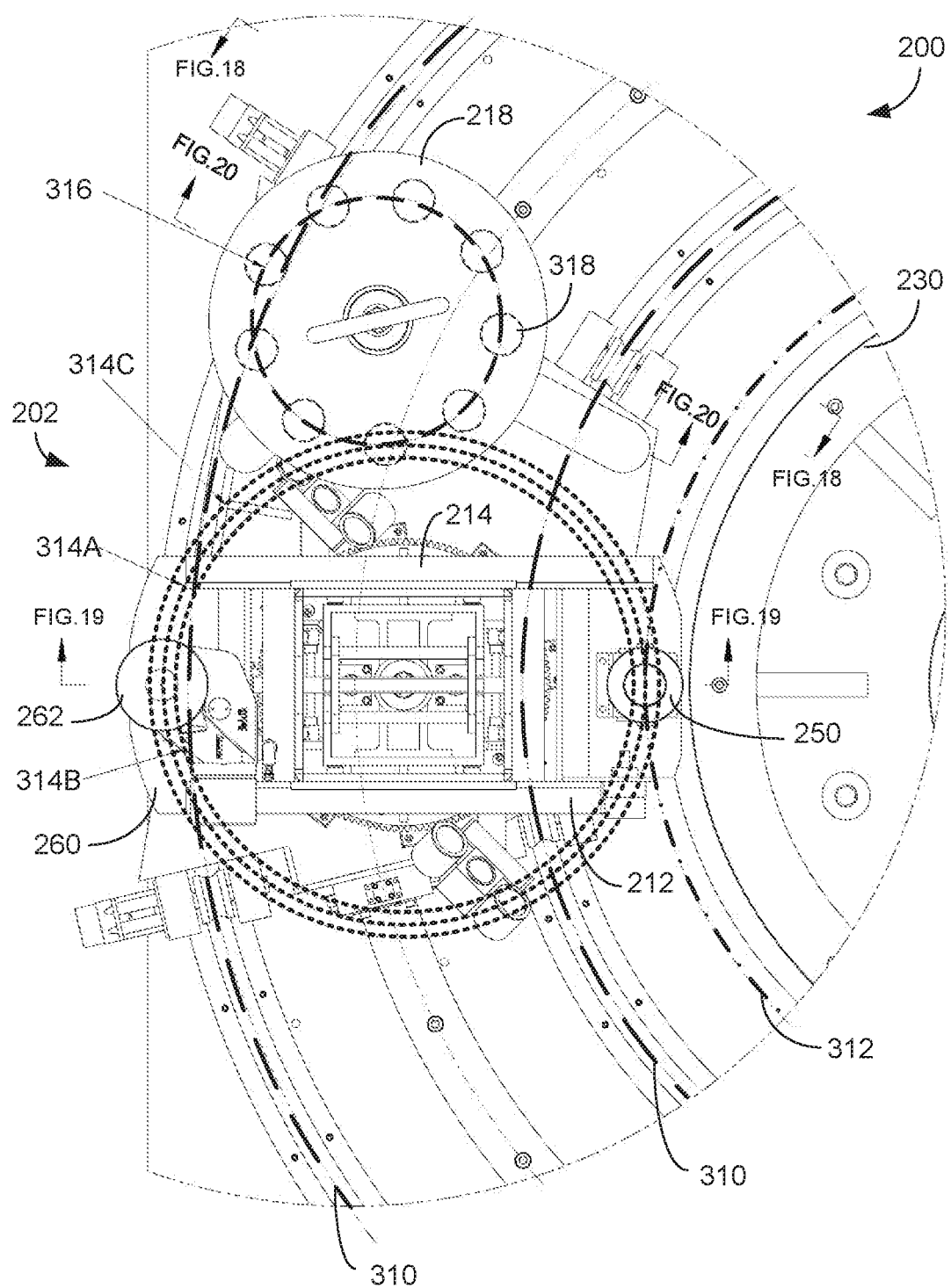
FIG. 17 is a top view of the tool cart showing movements of a tool tower and magazine tower.

FIG. 17 is a partial top view of BIR system 200 showing how components in tool cart 202 rotate along different paths. The center axes of slots 318 in magazine 218 may rotate along a circular path 316. The center axes of bolt holes and nuts 224 on nuclear vessel flange 222 (FIG. 2) extend along a path 312. Tool cart 202 travels along a track path 310 that is concentric with the bolt hole path 312.

Install head 250 and tensioning head 262 rotate along circular paths 314. When slide plate 260 of tool assembly 214 is in the intermediate position previously shown in FIG. 10, a center axis of install head 250 and a center axis of tensioning head 262 both may rotate along a circular path 314A.

Tool assembly 214 can use the same rotational path 314A to both access bolts on nuclear vessel flange 222 that extend along path 312 and access slots 318 in magazine 218 that extend along path 316. Tool assembly 214 can also move install head 250 and tensioning head 262 over the same rotational path 314A. Tool cart 202 moves along circular track path 310 to access different bolts on the nuclear vessel flange 222. Magazine 218 rotates different slots 318 into the intersecting position with path 314A to receive or provide different bolts to or from tool assembly 214.

Rotational paths 314B and 314C are created by moving slide plate 260 of tool assembly 214 into the position shown in FIG. 9 and the position shown in FIG. 11, respectively. For example, moving slide plate 260 into the lateral position as shown in FIG. 9 moves the centerline of install head 250 to rotational path 314B and moves the centerline of tensioning head 262 to rotational path 314C. Moving slide plate 260 to the position shown in FIG. 11 moves the centerline of install head 250 to rotational path 314C and moves the centerline of tensioning head to rotational path 314B.

As mentioned above, rotational path 314B may be necessary to install or remove bolts on flange 222 that are located slightly outside of bolt path 312. Rotational path 314C may be necessary to install or remove bolts on flange 222 that are located slightly inside of bolt centerline path 312. Any circular path between path 314B and 314C can be created by adjusting the position of slide plate 260.

Figure 18:
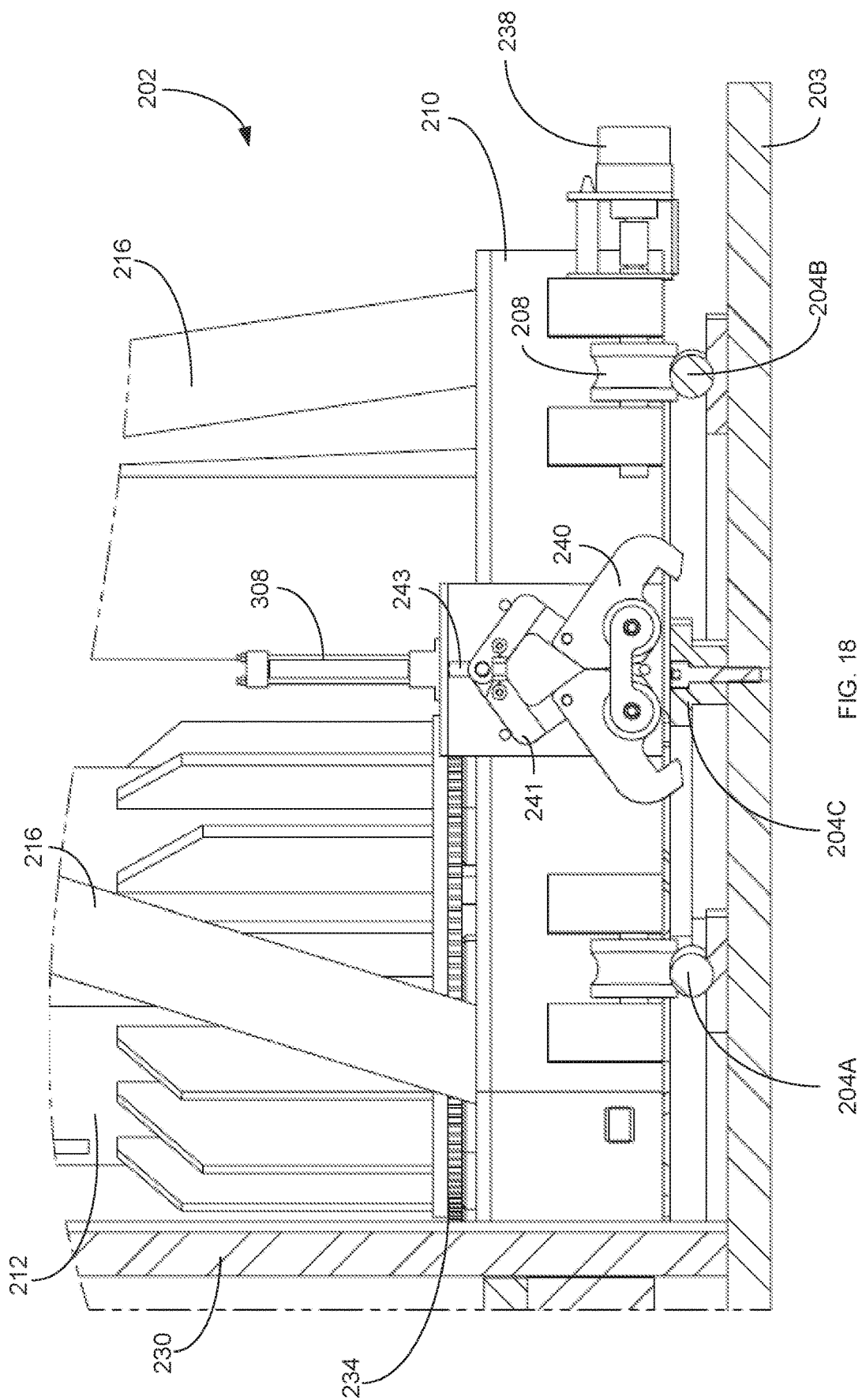
FIG. 18 is a partial front view of the tool cart.

FIG. 18 is a partial front view of tool cart 202. Tool tower 212 is rotationally coupled to tool cart platform 210 via gear assembly 234. Magazine tower 216 is rigidly attached to tool cart platform 210. Motor 238 rotates wheels 208 of tool cart 202 that sit on tracks 204. Tracks 204 extend circularly around support 230 that retains the nuclear vessel 210 in FIG. 2.

Hold down clamp 240 is shown in a normally retracted position. In response to a seismic event, hold down cylinder 308 extends a rod 243 that pushes a latch link 241 down and outward. Latch link 241 rotates the top ends of hold down clamp 240 outward causing the bottom ends of hold down clamp 240 to come together and clamp underneath center track 204C. Latch link 241 also holds clamp 240 in the locked position underneath center track 204C until hold down cylinder 308 retracts rod 243.

Figure 19:
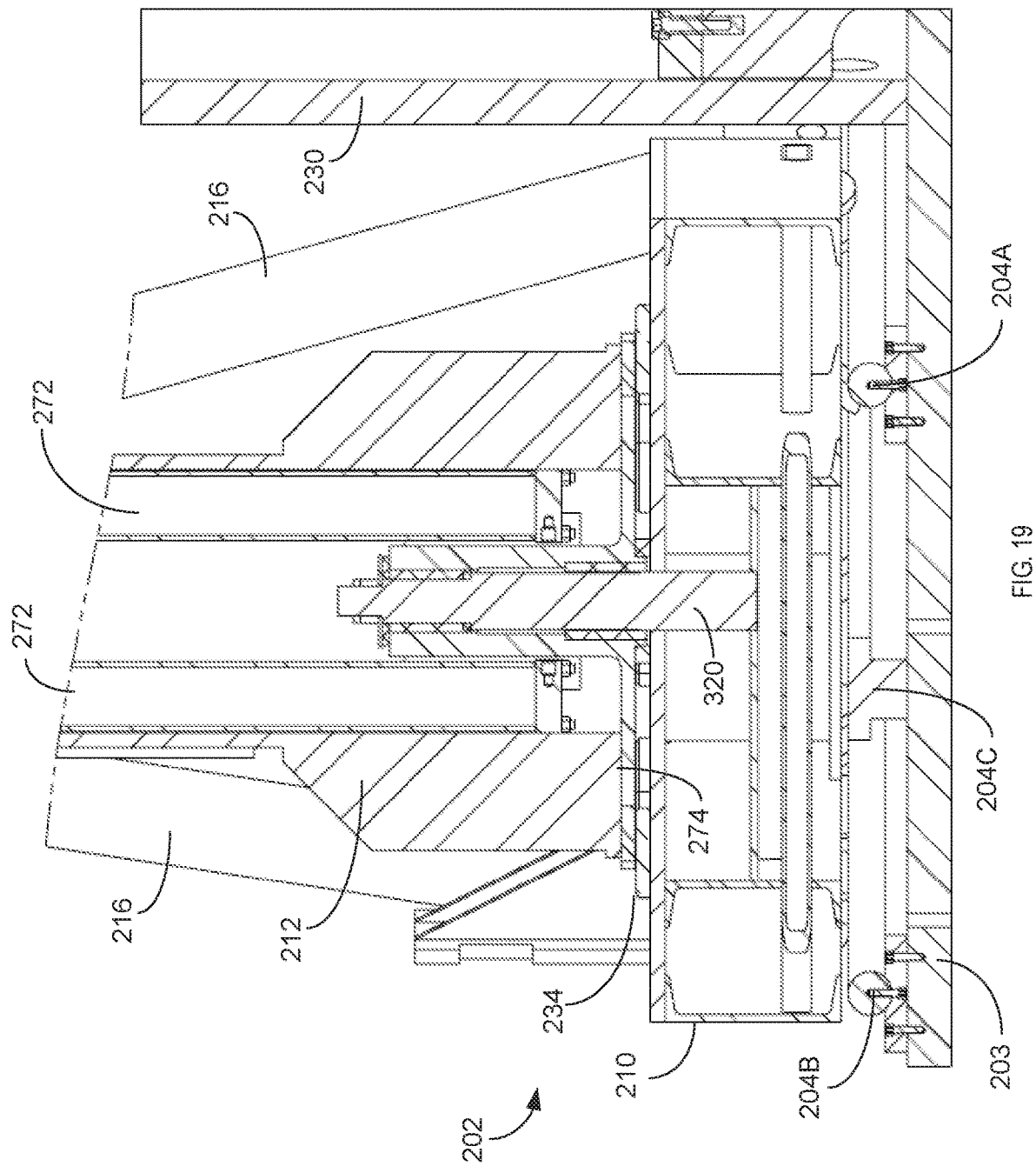
FIG. 19 is a partial sectional view of the tool cart.

FIG. 19 is partial side sectional view of tool cart 202. As described above, tracks 204A-204C lay on platform 203 and extend around the perimeter of nuclear vessel support 230. A round shaft 320 extends up from tool cart platform 210 to rotationally support tool tower 212. Hub 274 inserts into the bottom end of tool tower 212 and gear assembly 234 is attached underneath hub 274. Shaft 320 extends through a center hole in gear assembly 234 and into a central channel formed in hub 274. Motor 234 shown in FIG. 3 rotates gear assembly 234 causing tool tower 212 to rotate about a vertical central axis that extends through shaft 320. Cylinders 272 are connected on opposite inside walls of tool tower 212 and as explained above, raise and lower carriage 236.

Figure 20:
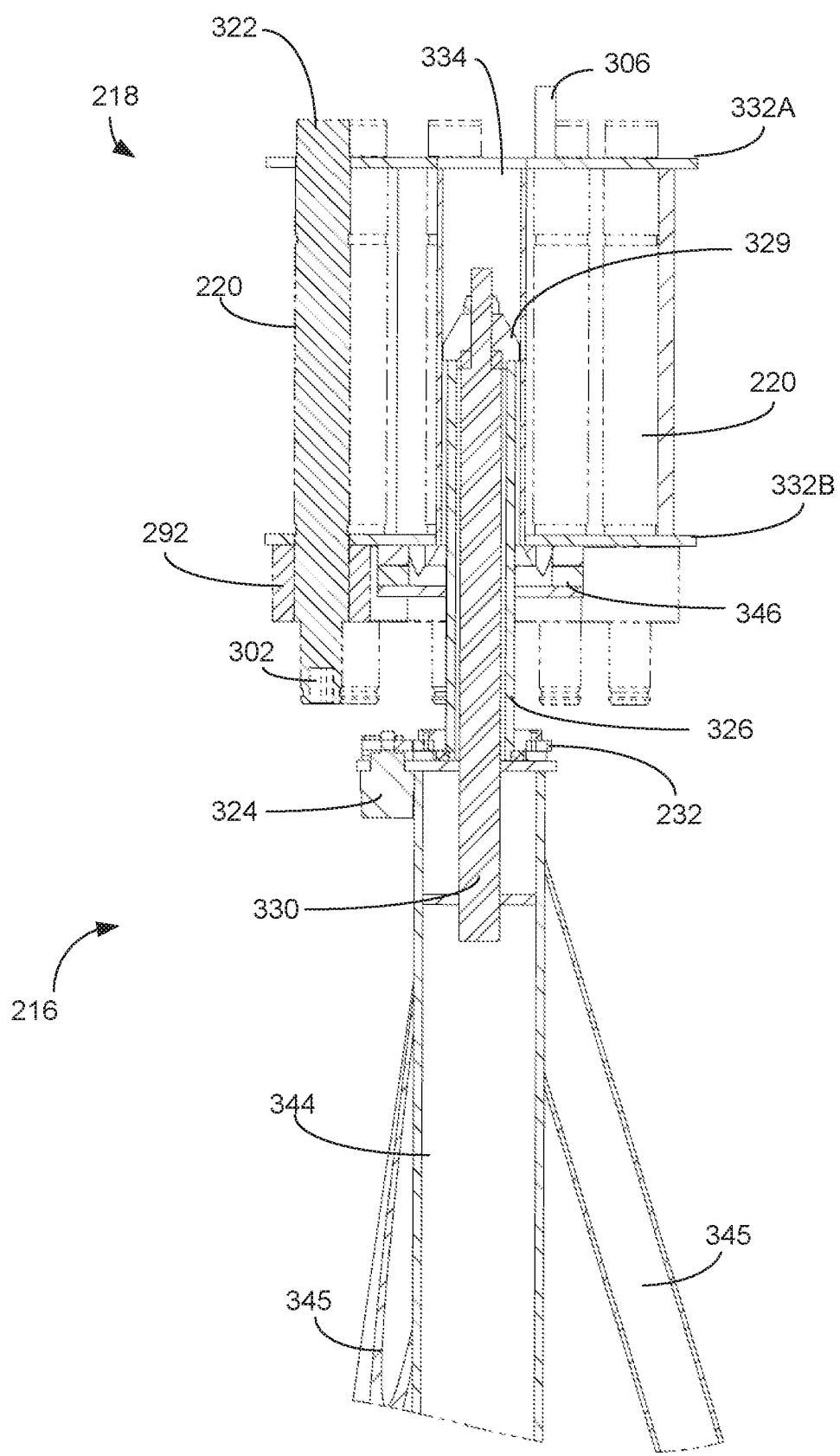
FIG. 20 is a sectional view of the magazine tower.
Figure 21:
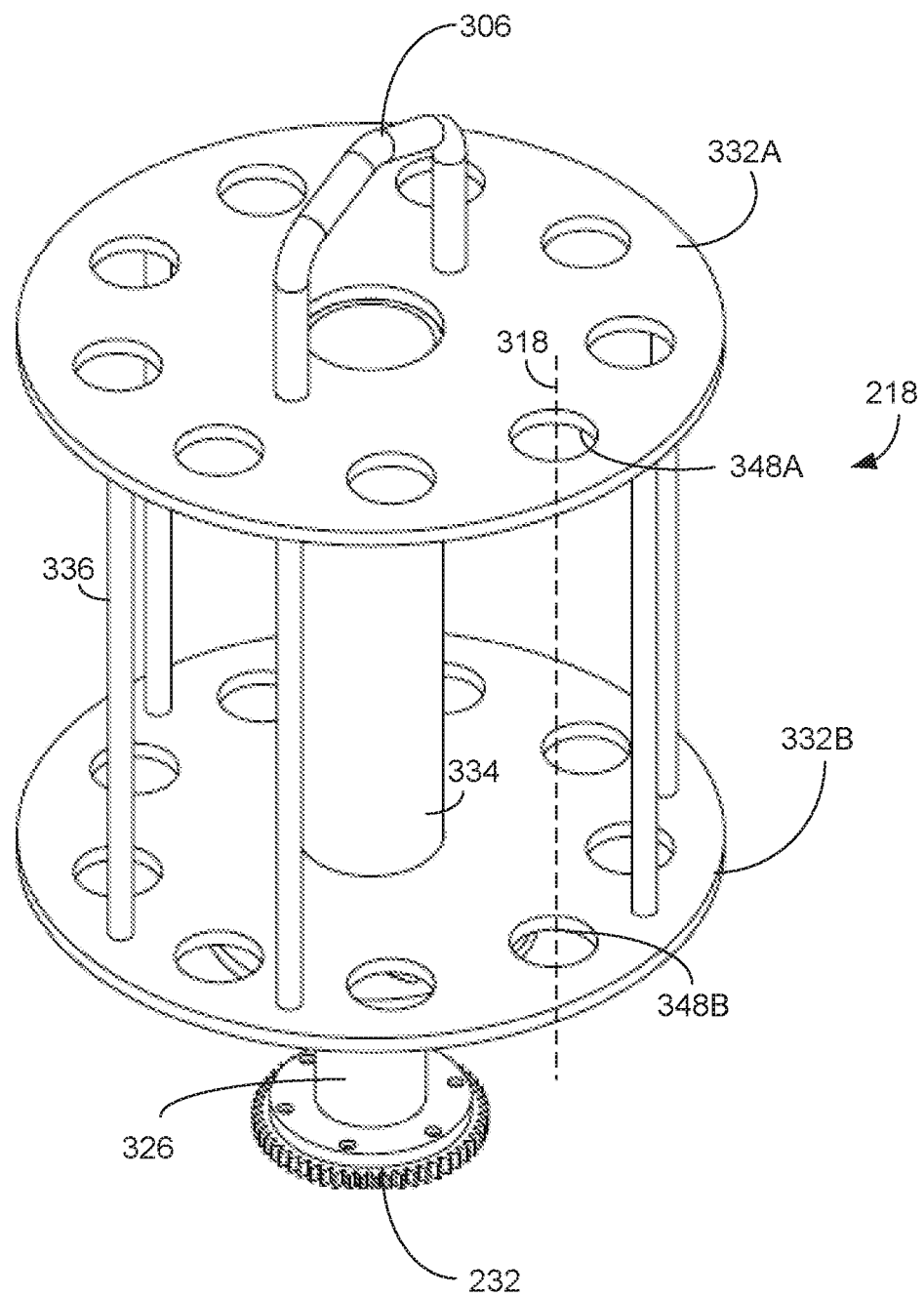
FIG. 21 is a perspective view of a magazine.

FIG. 20 is a side sectional view of magazine tower 216 and FIG. 21 is a perspective view of magazine 218. A main post 344 and support posts 345 of magazine tower 216 extend up from the platform of tool cart 202. A tubular rod 330 extends up from the top end of main post 344. A tubular turn table 326 attaches over rod 330 and is rotationally attached to rod 330 at a top end 329. Gear assembly 232 attaches around the bottom of turn table 326 and is rotationally connected to motor 324. An alignment plate 346 extends radially out from turn table 326.

Magazine 218 includes round top plate 332A and round bottom plate 332B connected together by supports 336 and a central hollow cylinder 334. Plates 332A and 332B each include sets of concentrically aligned holes 348A and 348B, respectively, that together form a circle of slots 318. As shown above, slots 318 hold bolts 220. Magazine 218 can be lowered downward by a crane onto turn table 326 extending up from magazine tower 216. Hollow cylinder 334 is lowered down over turn table 326 until bottom plate 332B seats on top of a alignment plate 346.

During a nuclear vessel disassembly operation, tool tower 212 may rotate into position 340 to initially loosen bolt 220 and/or attached closure nut 292 from flange 222. Tool tower 212 raises carriage 236 so tensioning head 262 inserts over closure nut 292 and the bottom end of bolt 222. Tensioning head 262 rotates in an opposite direction to loosen closure nut 292 and/or bolt 220 on flange 222. Tool tower 212 then rotates into position 338 in FIG. 23 and uses install head 250 to further loosen and remove bolt 220 from nut 224 and flange 222. Tool tower 212 rotates to position 337 in FIG. 22 to insert and screw the removed bolt 220 into magazine 218. Tool tower 212 then again may rotate in a counter-clockwise direction to position 340 in FIG. 24 to loosen a next bolt 220 and closure nut 292 on flange 222.

A crane can replace magazine 218 after slots 318 are filled with bolts 220. For example, the crane can attach to handle 306 and lift magazine 218 vertically up and off of turn table 326. The crane can then locate an empty magazine 218 over post 344. The empty magazine 218 is lowered so tapered top end 329 of turn table 326 inserts up through the bottom end of cylinder 334. The crane continues to lower magazine 218 until bottom plate 332B seats on top of alignment plate 346.

If magazine 218 is empty, for example during a nuclear vessel installation operation, the crane may locate a magazine 218 with a full set of bolts 220 over post 344. Magazine 218 is again lowered so tapered top end 329 of turn table 326 inserts up into the bottom end of cylinder 334. The crane continues to lower magazine 218 until bottom plate 332B seats on alignment plate 346.

Figure 22:
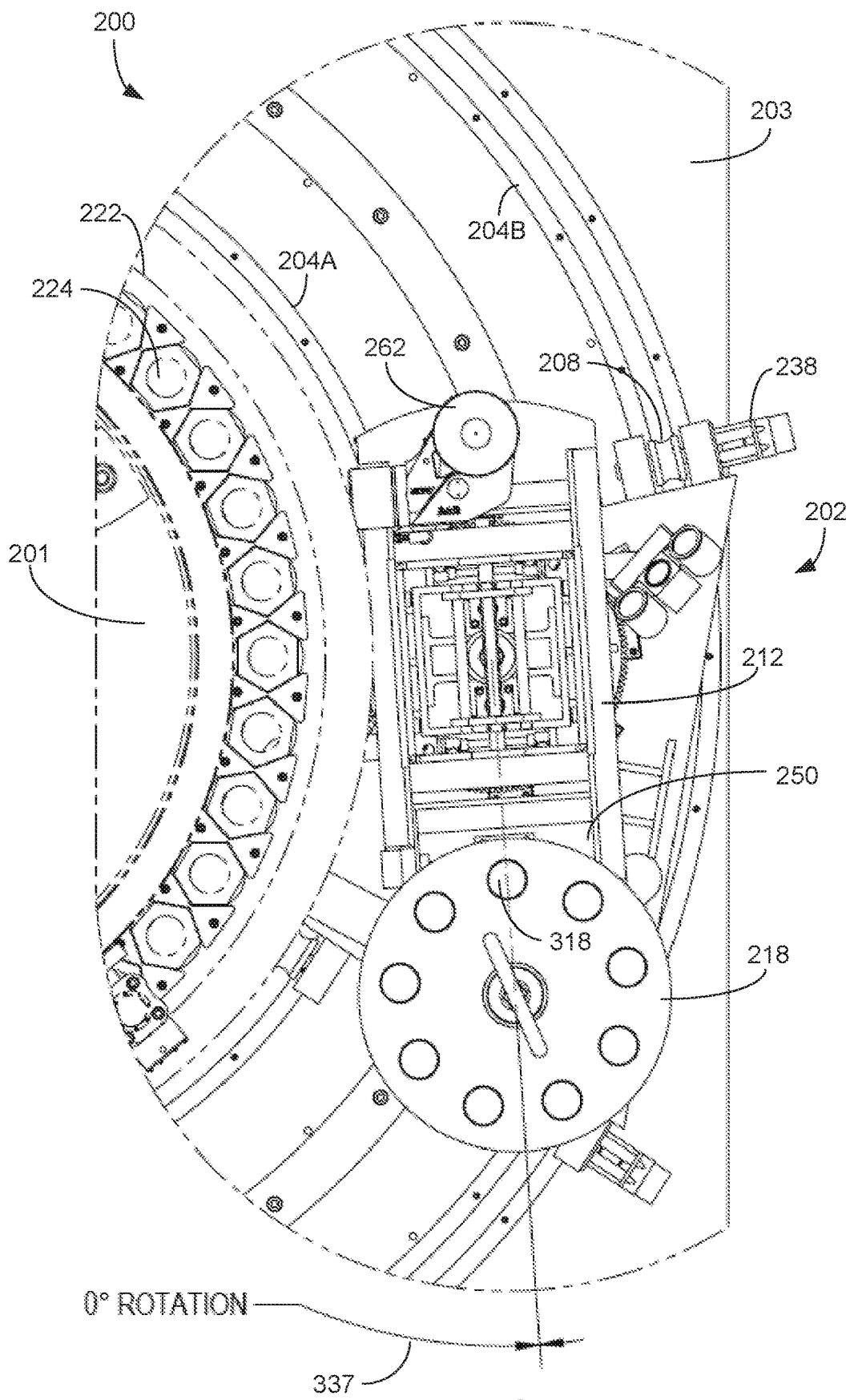
FIGS. 22, 23, 24, and 25 are top views of the tool cart in different rotational positions.

FIGS. 21, 22, 23, and 24 are partial top views of BIR system 200 with tool cart 202 in different operational positions. Referring first to FIG. 22, tool cart 202 is in a bolt transfer position 337 where install head 250 of tool tower 212 is positioned underneath a slot 318 of magazine 218. Tool tower 212 may rotate into position 337 to insert or remove a bolt 220 into or from magazine 216 as described above. Bolt transfer position 337 may alternatively be referenced as being in a zero rotational position.

Figure 23:
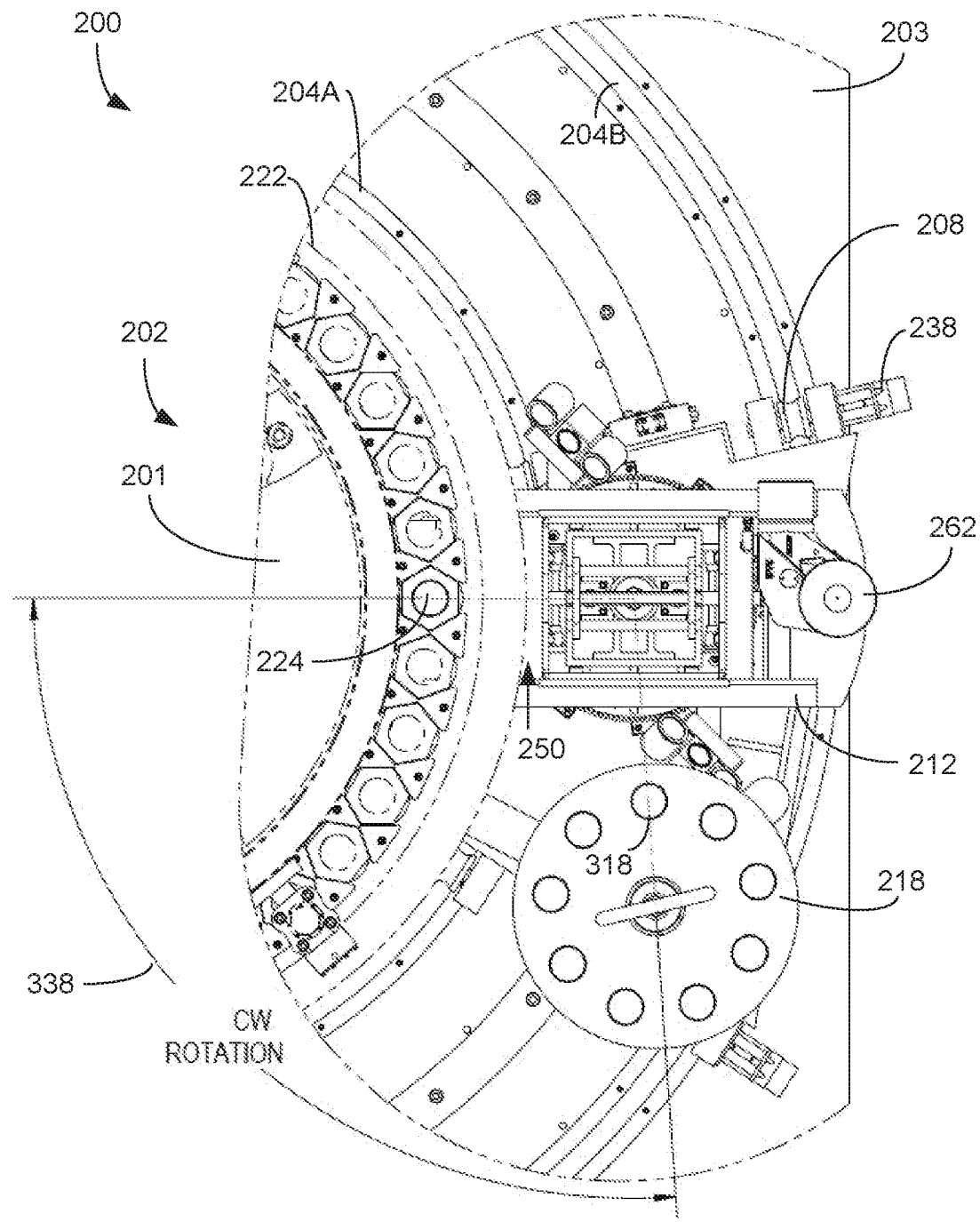

FIG. 23 shows an installation or removal position 338 where tool tower 212 is rotated in a clockwise direction to locate install head 250 underneath a nut 224 and associated bolt hole in flange 222 of nuclear vessel 201. During a nuclear vessel assembly operation, tool tower 212 raises carriage 236 so a bolt 220 in install head 250 inserts up into one of the bolt holes formed in flange 222. Install head 250 then screws bolt 220 into nut 224.

During a nuclear vessel disassembly operation, tensioning head 262 may have previously loosened bolt 220 from nut 224. Tool tower 212 raises carriage 236 inserting install head 250 over the bottom end of bolt 220. Install head 250 further unscrews bolt 220 from nut 224 on flange 222. Tool tower 212 lowers bolt 220 out of flange 222 and then rotates in a counter clockwise direction to the position shown in FIG. 22. Tool tower 212 then raises carriage 236 and screws bolt 220 into magazine 218 as described above.

Figure 24:
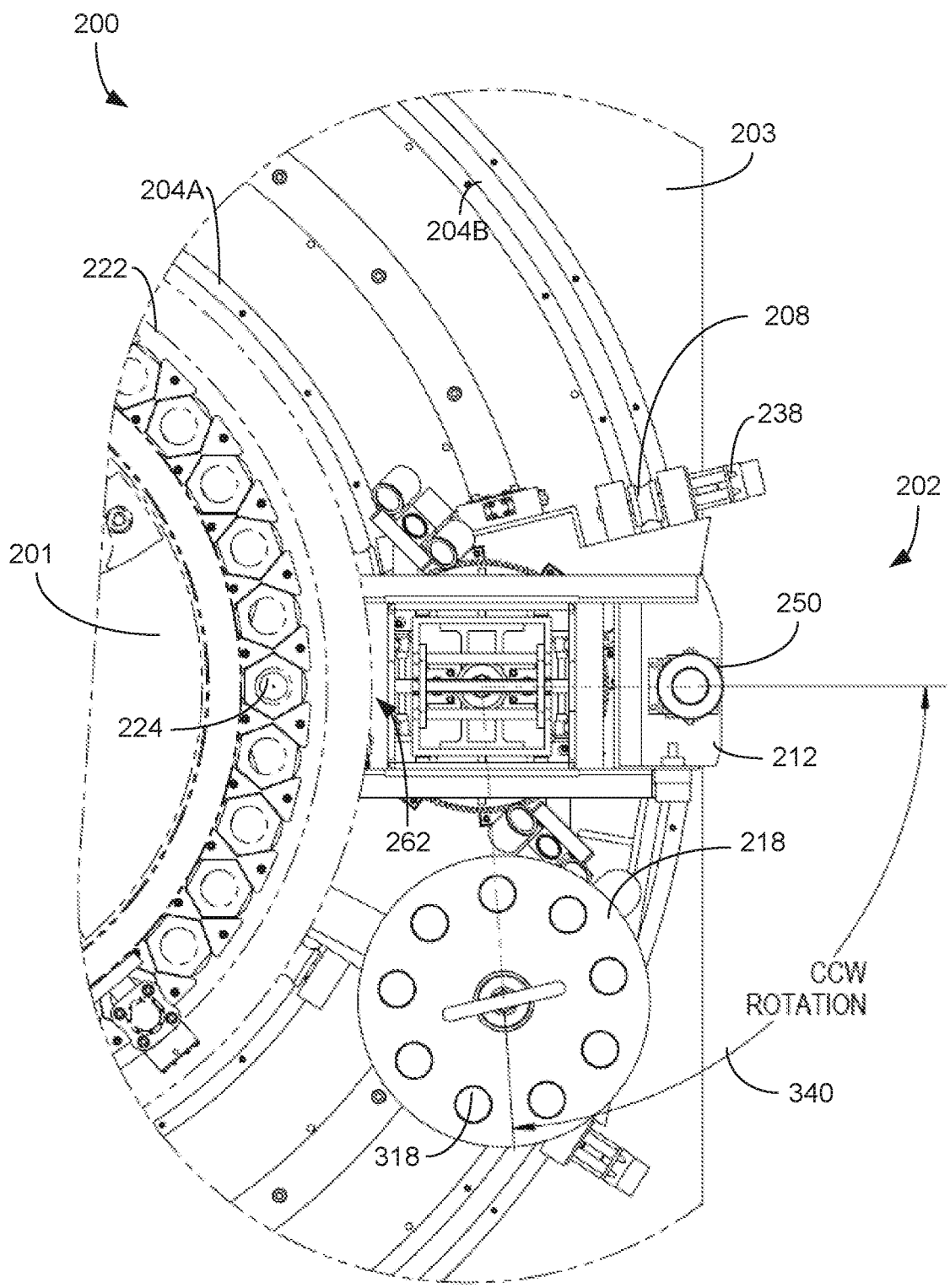

FIG. 24 shows a tensioning position 340 where tool tower 212 is rotated in a counter-clockwise direction from the initial position in FIG. 22 to locate tensioning head 262 underneath nut 224 and the attached bolt 220.

During a nuclear vessel assembly operation, install head 250 may have previously inserted bolt 220 up through flange 222 and screwed the bolt 220 into nut 224 with a first amount of torque. Tool tower 212 then may rotate into position 340 to further tension bolt 220 and/or the attached closure nut 292 to flange 222 with an added amount of torque. Tool tower 212 raises carriage 236 so tensioning head 262 inserts over closure nut 292 and the bottom end of bolt 222. Tensioning head 262 rotates tightening closure nut 292 and/or bolt 220 to flange 222. Tool tower 212 then lowers carriage 236 and rotates in a clockwise direction into position 337 in FIG. 22. Tool tower 212 uses install head 250 to install another bolt 220 from magazine 218 into a next bolt hole location on flange 222.

During a nuclear vessel disassembly operation, tool tower 212 may rotate into position 340 to initially loosen bolt 220 and/or attached closure nut 292 from flange 222. Tool tower 212 raises carriage 236 so tensioning head 262 inserts over closure nut 292 and the bottom end of bolt 222. Tensioning head 262 rotates in an opposite direction to loosen closure nut 292 and/or bolt 220 on flange 222. Tool tower 212 then rotates into position 338 in FIG. 23 and uses install head 250 to further loosen and remove bolt 220 from nut 224 and flange 222. Tool tower 212 rotates to position 337 in FIG. 22 to insert and screw the removed bolt 220 into magazine 216. Tool tower 212 then again may rotate in a counter-clockwise direction to position 340 in FIG. 24 to loosen a next bolt 220 and closure nut 292 on flange 222.

Figure 25:
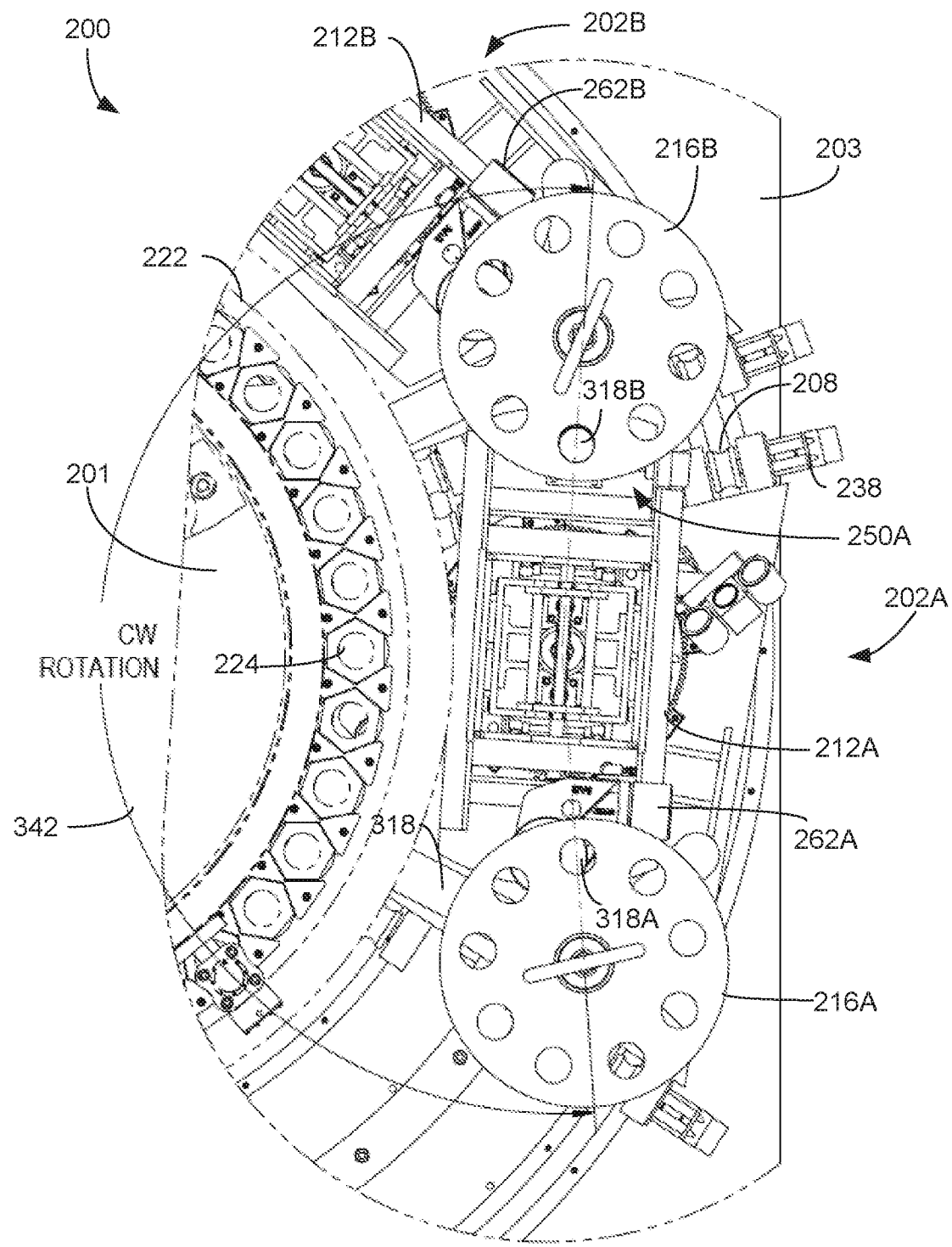

FIG. 25 shows an inter-cart transfer position 342 between two tool carts 202A and 202B. For a variety of reasons, tool cart 202A may transfer bolts to or from a magazine 216B on an adjacent tool cart 202B. For example, magazine 216A on tool cart 202A may be empty or full and it may be more convenient to transfer remaining bolts to or from magazine 216B than replace magazine 216A. In another example, magazine 216A may be inoperative. In either case, BIR system 200 provides redundancy by allowing each tool cart 202 to exchange bolts 220 with adjacent tool carts 202.

In this example, tool tower 212A on tool cart 202A rotates in a clockwise direction into position 342. Install head 250A in tool cart 202A performs the same procedures described above to install or remove a bolt 220 into or from slot 318B in magazine 216B of tool cart 202B. Tool carts 202A and 202B may perform any other install or removal procedure with the other adjacent tool cart. For example, tensioning head 262A on tool cart 202A may loosen bolts 220 on flange 222 for an inoperative tensioning head 262B on tool cart 202B.

Thus, BIR system 200 provides a relatively simple mechanical control system that reduces the number of active components needed for servicing nuclear reactors. The interactions between adjacent tool carts further increase redundancy and reliability. The high reliability of BIR system 200 is particularly advantageous in nuclear applications where nuclear vessel 210 needs to be disassembled and reassembled under water. It should also be understood that BIR system 200 may be used for installing and removing bolts or any other element from any other type of structure.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A tool cart for assembling and disassembling a nuclear vessel, comprising:
   a platform configured to travel around an outside perimeter of the nuclear vessel;
   a tool tower extending up from the platform;
   a tool assembly attached to the tool tower configured to rotate about a vertical axis to install bolts on the nuclear vessel and remove the bolts from the nuclear vessel;
   a magazine tower extending up from the platform;
   a center shaft extending up from a top end of the magazine tower;
   a magazine including a cylinder for removably sliding over the center shaft; and
   a gear and motor for rotating the magazine about a second vertical axis.

2. The tool cart of claim 1, wherein the magazine includes:
   an upper plate attached to the top end of the cylinder and including a first set of circularly arranged holes; and
   a lower plate attached to a bottom end of the cylinder and including a second set of circularly arranged holes concentrically aligned with the first set of holes forming a set of circularly arranged slots.

3. The tool cart of claim 1, wherein:
   the motor rotates different slots of the magazine into an exchange position with the tool assembly; and
   the tool assembly rotates from a first position underneath the slots in the exchange position and a second position underneath a bolt hole on the nuclear vessel.

4. The tool cart of claim 3, wherein:
   the motor rotates the slots along a first circular path; and
   the tool tower rotates a tool head on the tool assembly along a second circular path that intersects the first circular path.

5. A tool cart for assembling and disassembling a nuclear vessel, comprising:
   a platform configured to travel around an outside perimeter of the nuclear vessel;
   a tool tower extending up from the platform, wherein the tool tower includes
   a tool base;
   a carriage moving vertically up and down the tool base; and
   a gear assembly positioned to rotate the tool base and carriage about a vertical axis; and
   a tool assembly supported by the carriage, wherein the tool assembly is configured to rotate about the vertical axis to install bolts on the nuclear vessel and remove the bolts from the nuclear vessel.

6. The tool cart of claim 5, wherein the tool assembly includes:
   a slide plate horizontally displaceable relative to the tool base;
   an install head located on a first end of the slide plate; and
   a tensioning head located on a second opposite end of the slide plate.

7. A tool cart for assembling and disassembling a nuclear vessel, comprising:
   a platform configured to travel around an outside perimeter of the nuclear vessel;
   a tool tower extending up from the platform;
   a tool assembly attached to the tool tower configured to rotate about a vertical axis to install bolts on the nuclear vessel and remove the bolts from the nuclear vessel, wherein the tool assembly includes
   an install head;
   a drive bit located in the install head;
   a drive bit cylinder extending the drive bit vertically up into a bottom hole formed in each of the bolts; and
   a bolt clip positioned to retain one of the bolts and extend out and release the retained bolt when the drive bit cylinder extends the drive bit up into the bottom bolt hole.

8. The tool cart of claim 5, further comprising wheels located on the platform configured to travel over a track that extends around a perimeter of the nuclear vessel.

9. The tool cart of claim 8, including:
   a hold down clamp attached to the platform including reciprocating claws; and
   a hold down cylinder configured to extend a rod causing the claws to retract and attach onto the track.

10. A tool tower for attaching and detaching a bolt to a nuclear vessel, comprising:
    a base rotatably attached to a platform;
    a carriage extending around the base;
    a slide plate attached to the carriage;
    a tool head attached to the slide plate for attaching and detaching the bolt on the nuclear vessel;
    a first drive mechanism coupled to the base for rotating the tool head along a circular path about a vertical axis;

a second drive mechanism coupled to the carriage for moving the tool head vertically up and down on the base; and a third drive mechanism coupled to the slide plate for moving the tool head laterally relative to the base.

11. The tool tower of claim 10, including:

a first tool head located on a first end of the slide plate for installing and removing the bolt on the nuclear vessel; and a second tool head located on a second opposite end of the slide plate for tensioning the bolt on the nuclear vessel.

12. The tool tower of claim 11, wherein the drive bit includes a shoulder that presses against oppositely facing protuberances formed in the bolt clips as the drive bit cylinder extends the drive bit up into the hole formed in the bolt.

13. The tool tower of claim 10, wherein the tool head includes:

a top opening for receiving a bottom end of the bolt;

a drive bit located in the tool head;

a drive bit cylinder coupled to the end of the drive bit extending the drive bit vertically up into a bolt hole formed in the bottom end of the bolt; and bolt clips clamping onto the bolt when inserted into the top opening and to release the bolt when the drive cylinder extends the drive bit upward into the bolt hole.

14. The tool tower of claim 10, wherein the first drive mechanism comprises:

a gear assembly located between a bottom end of the base and a tool cart platform; and a motor rotating the gear assembly and the base about a shaft that extends up from the tool cart platform.

15. The tool tower of claim 10, wherein the second drive mechanism comprises one or more cylinders coupled at a first end to the base and coupled at a second end to the carriage.

16. The tool tower of claim 10, wherein the third drive mechanism comprises a motor moving the slide plate and tool head laterally relative to the base.

17. A bolt installation and removal system for assembling and disassembling a nuclear vessel, comprising:

a platform including a stand for supporting the nuclear vessel;

a track that extends around an outside perimeter of the platform;

multiple tool carts including wheels that roll on the track;

tool towers located on the carts; and tool assemblies attached to the tool towers configured to install and remove bolts on the nuclear reactor vessel.

18. The system of claim 17, including magazine towers extending up from the tool carts next to the tool towers, the magazine towers including magazines that hold bolts for exchanging with the tool assemblies on the tool towers.

19. The system of claim 18, wherein the tool assemblies are configured to exchange bolts with the magazines on adjacent ones of the tool carts.

20. The system of claim 18, wherein the tool carts include:

first drive mechanisms for rotating the tool assemblies about a first vertical axis;

second drive mechanisms moving the tool assemblies vertically up and down;

third drive mechanisms laterally extending and retracting the tool assemblies relative to the tool towers; and fourth drive mechanisms rotating the magazines about a second vertical axis.

21. The system of claim 20, wherein:

centerlines of tool heads in the tool assemblies travel along a first circular path about the first vertical axis that intersects a bolt hole in the nuclear vessel; and slots in the magazines travel in a second circular path about the second vertical axis that intersects the first circular path.

* * * * *

UNITED STATES PATENT AND TRADEMARK OFFICE
CERTIFICATE OF CORRECTION

| | |
|---|---|
| PATENT NO. | : 11,017,909 B2 |
| APPLICATION NO. | : 15/841056 |
| DATED | : May 25, 2021 |
| INVENTOR(S) | : Steven W. Shaw et al. |

It is certified that error appears in the above-identified patent and that said Letters Patent is hereby corrected as shown below:

In the Specification

In Column 5, Line 4, delete "of the of the" and insert -- of the --.

Signed and Sealed this
Eighth Day of November, 2022

Katherine Kelly Vidal
*Director of the United States Patent and Trademark Office*